(12) United States Patent
Yamada et al.

(10) Patent No.: US 6,560,612 B1
(45) Date of Patent: May 6, 2003

(54) INFORMATION PROCESSING APPARATUS, CONTROLLING METHOD AND PROGRAM MEDIUM

(75) Inventors: Shigemi Yamada, Kanagawa (JP); Ryoji Amemiya, Kanagawa (JP); Tatsuya Isoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/461,925

(22) Filed: Dec. 15, 1999

(30) Foreign Application Priority Data

Dec. 16, 1998 (JP) .......................... 10-357263
Mar. 24, 1999 (JP) .......................... 11-079000

(51) Int. Cl.$^7$ .............................. G06F 7/00; G09G 5/00; G09G 5/02
(52) U.S. Cl. ..................... 707/104.1; 345/702; 345/173
(58) Field of Search .............................. 708/100, 112, 708/114; 707/1–104.1; 364/900–927; 463/2–4, 23; 345/173, 702; 711/100, 101; 710/1–2, 8, 30; 712/200, 248

(56) References Cited

U.S. PATENT DOCUMENTS 3,999,050 A * 12/1976 Pitroda ........................ 708/112
5,008,854 A *  4/1991 Maeda et al. ................ 364/900
6,155,924 A * 12/2000 Nakagawa et al. ............ 463/4

* cited by examiner

*Primary Examiner*—Safet Metjahic
*Assistant Examiner*—Susan Chen
(74) *Attorney, Agent, or Firm*—Frommer Lawrence & Haug LLP; William S. Frommer

(57) ABSTRACT

The invention provides an information processing apparatus which can input various kinds of information simply with reliability without increasing the scale thereof. An LCD is disposed on the back of a touch pad, and when a function button is operated, a menu for allowing selection of a function is displayed on the LCD. When a user operates the touch pad to select, for example, ten keys from within the menu, ten keys are displayed on the LCD. Desired operation can be performed by operating the ten keys.

25 Claims, 22 Drawing Sheets

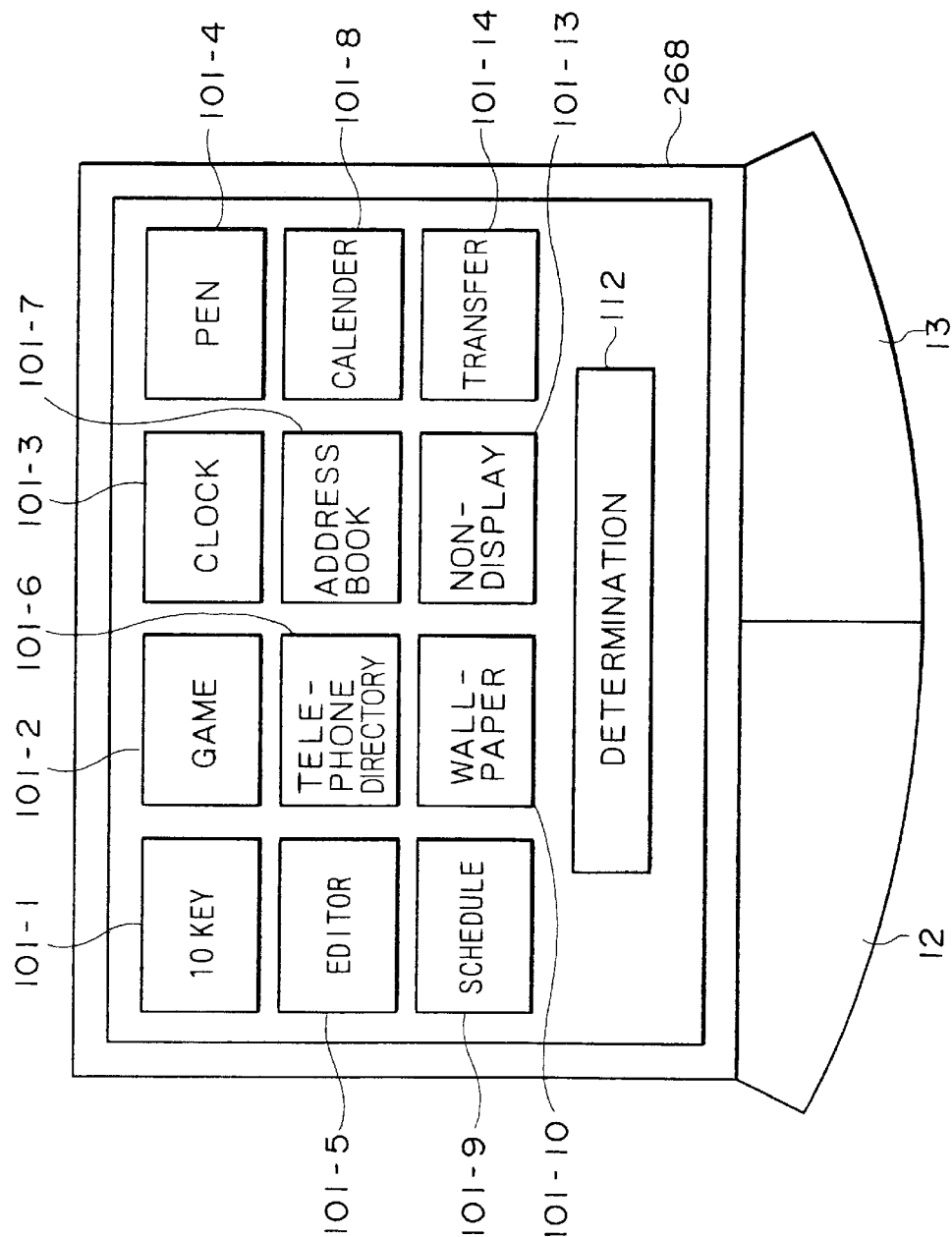

INFORMATION PROCESSING APPARATUS, CONTROLLING METHOD AND PROGRAM MEDIUM

BACKGROUND OF THE INVENTION

This invention relates to an information processing apparatus, a controlling method and a program medium and more particularly to an information processing apparatus, a controlling method and a program medium which can input various kinds of information.

Recently, portable personal computers have been and are being popularized. One of reasons why portable personal computers are popularized resides in their high convenience in that, for example, a user can carry a portable personal computer to another room in the same building or to a client to perform presentation of various kinds of information. Accordingly, a portable personal computer is naturally required to be small in size and light in weight from its original functions.

In order to make it possible for many users to operate a personal computer simply, a pointing device represented by a mouse is utilized as an inputting apparatus to a computer. Since even a person who is not familiar with a keyboard can perform an inputting operation comparatively readily using a pointing device, pointing devices have been and are being popularized rapidly. Since it is inconvenient to carry a mouse separately from a computer body particularly of a portable personal computer, such a pointing device as a touch pad or a track ball is provided frequently on portable personal computers.

A portable personal computer is disclosed, for example, in Japanese Patent Laid-Open No. Hei 10-214154 wherein a pointing device is removably mounted on a computer body and is utilized as a remote controller in order to assure a high degree of convenience in use.

Another portable personal computer is disclosed in Japanese Patent Laid-Open No. Hei 10-74119 wherein a PDA (Personal Digital Assistant) is removably mounted on a computer body such that it not only can be remotely controlled in a presentation but also can be utilized as a stand-alone device in order to achieve a higher degree of convenience.

However, any of such pointing devices as proposed in the past requires many buttons and switches in order to allow selective inputting of a predetermined one of many kinds of inputs depending upon the case, and such buttons and switches increase the size of the pointing device. Consequently, the portable personal computer in which the pointing device is incorporated is increased in size, and after all, the range of use of the portable personal computer is restricted.

Further, since the PDA proposed in Japanese Patent Laid-Open No. Hei 10-74119 does not have a function as a pointing device, a mouse or some other pointing device must be additionally provided to the portable personal computer, resulting in increase of the scale and the cost of the apparatus.

SUMMARY OF THE INVENTION

It is an object of the present invention to provide an information processing apparatus, a controlling method and a program medium which can input various kinds of information simply and with reliability without increasing the scale thereof.

In order to attain the object described above, according to a first aspect of the present invention, there is provided an information processing apparatus, including first inputting means for inputting predetermined information, first processing means for processing the information inputted from the first inputting means, first displaying means for displaying the information processed by the first processing means, second displaying means for displaying information, and second inputting means for inputting predetermined information, the second inputting means being disposed on a front side of the second displaying means in such a manner as to allow the information displayed on the second displaying means to be visually observed through the second inputting means, the first processing means controlling, in a normal operation mode, the first displaying means to display the information processed by the first processing means based on coordinate data inputted from the second inputting means.

In the information processing apparatus, information is displayed not only on the first displaying means but also on the second displaying means. The second inputting means is disposed such that the information displayed on the second displaying means may be visually observed therethrough.

Consequently, with the information processing apparatus, since the second displaying means which can be visually observed through the second inputting means is provided in addition to the first displaying means, coordinate data can be inputted (for example, a function as a pointing device can be implemented) and besides a predetermined function can be selected and inputted rapidly and with reliability from among many functions without increasing the size of the apparatus.

According to a second aspect of the present invention, there is provided a controlling method for controlling an information processing apparatus which includes first inputting means for inputting predetermined information, first displaying means for displaying the information inputted from the first inputting means, second displaying means for displaying information, and second inputting means for inputting predetermined information, the second inputting means being disposed on a front side of the second displaying means in such a manner as to allow the information displayed on the second displaying means to be visually observed through the second inputting means, the controlling method including a detection step of detecting a mode, and a displaying step of causing, in an ordinary operation mode, the first displaying means to display the information inputted from the first inputting means based on coordinate data inputted from the second inputting means.

According to a third aspect of the present invention, there is provided a program medium for causing an information processing apparatus, which includes first inputting means for inputting predetermined information, first displaying means for displaying the information inputted from the first inputting means, second displaying means for displaying information, and second inputting means for inputting predetermined information, the second inputting means being disposed on a front side of the second displaying means in such a manner as to allow the information displayed on the second displaying means to be visually observed through the second inputting means, to execute a program which includes a detection step of detecting a mode, and a displaying step of causing, in an ordinary operation mode, the first displaying means to display the information inputted from the first inputting means based on coordinate data inputted from the second inputting means.

The above and other objects, features and advantages of the present invention will become apparent from the fol-

BRIEF DESCRIPTION OF THE DRAWINGS

FIG. 22 is a diagrammatic view showing an example of a display of an LCD shown in FIG. 19.

DESCRIPTION OF THE PREFERRED EMBODIMENT

Figure 1:
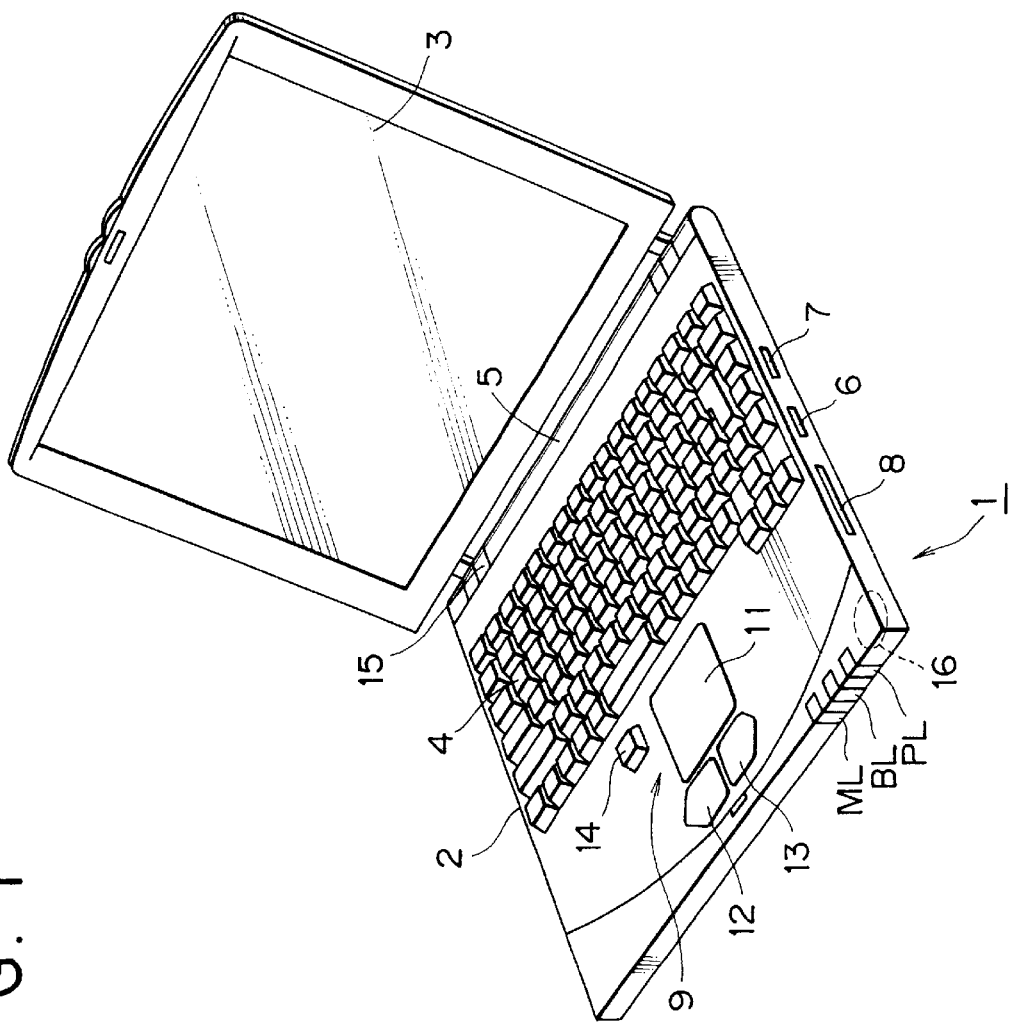
FIG. 1 is a perspective view showing an appearance of a portable personal computer to which the present invention is applied.

Referring first to FIG. 1, there is shown a notebook type portable personal computer to which the present invention is applied. The portable personal computer is generally denoted at 1 and includes a body 2 on which a keyboard 4 which is operated to input characters and other information is provided. A display unit 3 for displaying an image thereon is mounted for opening and closing pivotal (folding) motion on the body 2. Though not shown, an external pointing device such as a mouse may be externally provided for the body 2.

The body 2 includes a power supply lamp PL, a battery lamp BL and a message lamp ML. The power supply lamp PL is lit when the power supply is on. The battery lamp BL indicates a degree of a remaining capacity of a battery pack 5. The message lamp ML is exposed to the outside even when the display unit 3 is closed with respect to the body 2. Consequently, even if the display unit 3 is closed, an operation of a predetermined program can be known to a user from lighting of the message lamp ML.

A power supply switch 6 which is operated to connect or disconnect the power supply and an operation key 7 for one touch operation are provided on a side wall of the body 2. The operation key 7 is operated in order to start up a predetermined application in a moment, and the thus started up state is indicated by the message lamp ML. The side face of the body 2 further has a slot 8 into which a PCMCIA (Personal Computer Memory Card International Association) card (PC card) is inserted.

A touch operation section 9 is provided in front of the keyboard 4 on the upper face of the body 2. The touch operation section 9 includes a touch pad 11, a left button 12, a right button 13 and a function button 14.

The touch pad 11 is operated with a finger or a pen (though not shown in FIG. 1, the pen is accommodated in a left side wall of the display section 3) by the user. The touch pad 11 is operated in a rubbing manner, for example, in order to move a pointer displayed on an LCD 41 (FIG. 2) of the display unit 3 to a predetermined position. The left button 12 is operated in order to select "OK" or "cancel" or to perform selection from a menu. Also when the touch pad 11 is tapped on once with a finger, a similar function is executed. The left button 12 is operated successively twice in order to effect double clicks. In order to drag the pointer, a finger is moved on the touch pad 11 while the left button 12 is kept operated. Also if the touch pad 11 is tapped on successively twice and then a finger is moved on the touch pad 11 as it is, a drag operation is performed. The right button 13 is operated in order to display a backup menu of various contents and so forth.

A microphone 15 is provided on the left side of the battery pack 5, and a speaker 16 is provided in the proximity of the power supply lamp PL on the bottom of the body 2.

Figure 2:
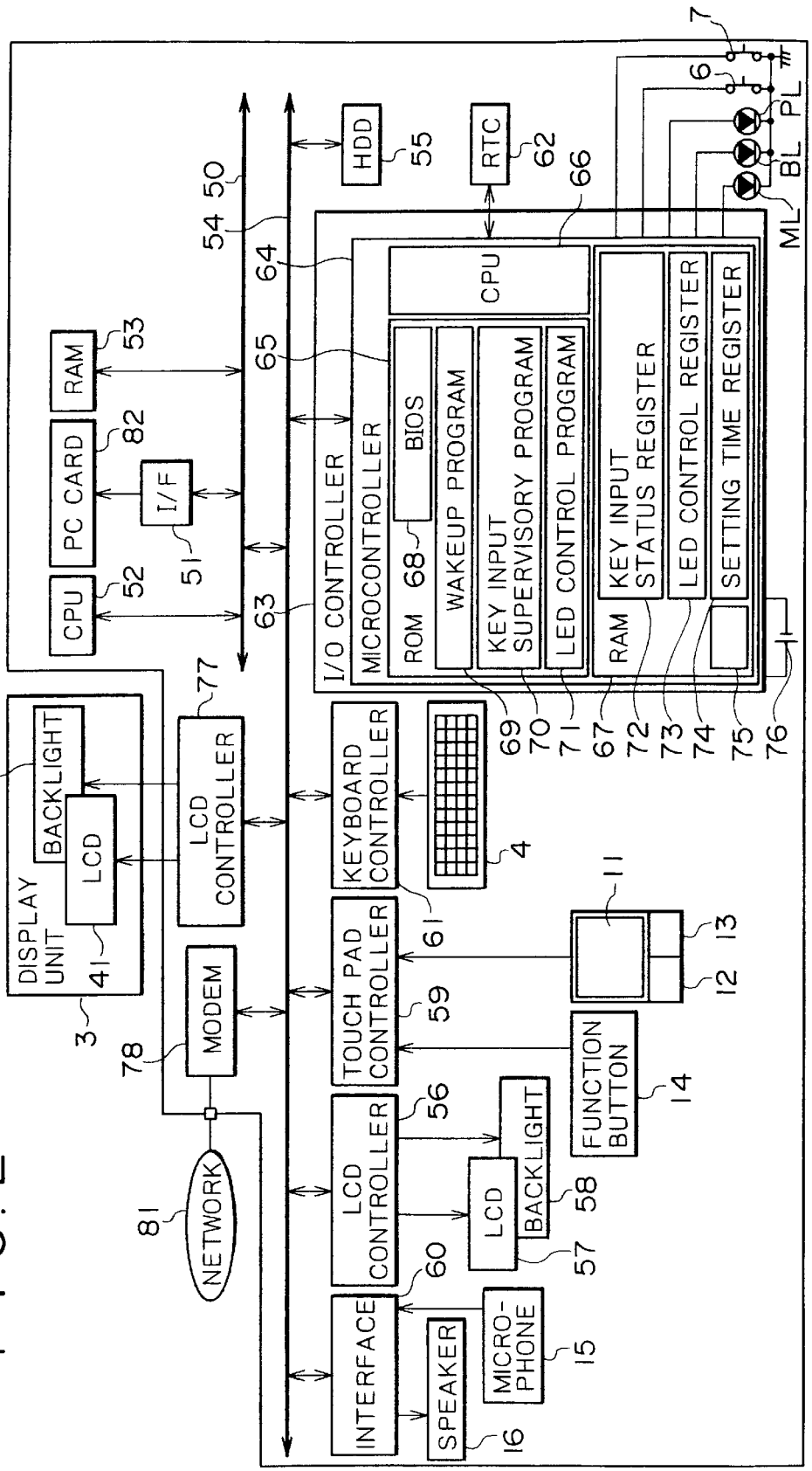
FIG. 2 is a block diagram showing an example of an internal construction of the portable personal computer of FIG. 1.

FIG. 2 shows an example of an internal construction of the portable personal computer 1. The portable personal computer 1 includes a CPU (Central. Processing Unit) 52 which performs processing of information in a concentrated manner and a RAM (Random Access Memory) 53 in the form of a volatile memory. The CPU 52 and the RAM 53 are connected to an internal bus (PCI (Peripheral Component Interconnect) BUS) 50. Also a PC card 82 inserted in the slot 8 and having a predetermined function is connected to the internal bus 50 through an interface (I/F) 51.

The CPU 52 is a controller which controls various functions, and the PC card 82 adds an optical function to the internal bus 50. When starting up of the body 2 is completed, an application program, an automatic pilot program, a basic program (operating system: OS) and so forth are stored into the RAM 53.

The automatic pilot program is used to successively activate and process a plurality of processes (or programs) and so forth set in advance in a preset order. The OS is used to control basic operations of the portable personal computer 1, and a multi-task OS on the market such as, for example, the Windows 98 (trademark) may be used for the OS.

The body 2 further includes an I/O (in-out) controller 63 for controlling inputting and/or outputting of data, a HDD (Hard Disc Drive) 55 serving as a recording section for recording information, a real time clock (RTC) 62 and a backup battery 76.

The I/O controller 63, HDD 55, RTC 62, message lamp ML, battery lamp BL, power supply lamp PL, power supply switch 6, operation key 7 and backup battery 76 are connected to an external bus 54 (ISA BUS). The external bus 54 is connected to the internal bus 50.

The I/O controller 63 has a microcontroller 64 which includes a CPU 66, a RAM 67 and a ROM 65 connected to each other. The RAM 67 includes a key input status register 72, an LED control register 73, a setting time register 74 and an operation key/program corresponding relationship register 75. The setting time register 74 serves as an activation condition storage section and stores a time (activation condition) set by the user in advance. The setting time register 74 is used to start an operation of an activation sequence which is a series of processes for activating a predetermined program when a preset time comes. The operation key/program corresponding relationship register 75 stores correspondences between combinations (activation conditions) of operation keys set in advance and application programs to be activated. Thus, if a combination of operation keys set in advance are depressed by the user, then the application program to be activated is activated.

The key input status register 72 stores an operation key flag when the operation key 7 as a switch for one touch operation is depressed. The LED control register 73 controls lighting of the message lamp ML which indicates a momentary activation state of a predetermined application when the operation key 7 is depressed. The setting time register 74 is used to arbitrarily set a certain time thereon.

It is to be noted that the backup battery 76 is provided for the microcontroller 64 so that stored values of the registers 72, 73 and 74 may be retained also in a state wherein the power supply to the body 2 is off.

A wakeup program 69, a key input supervisory program 70 and an LED control program 71 are stored in advance in the ROM 65 in the microcontroller 64. The ROM 65 is formed from, for example, an electrically erasable programmable read-only memory (EEPROM) which is also called flash memory. Further, the RTC 62 for normally counting the present time is connected to the microcontroller 64.

The wakeup program 69 in the ROM 65 is used to check, based on present time data supplied thereto from the RTC 62, whether or not the time set in advance to the setting time register 74 comes, and activate a predetermined process (or program) or the like when the preset time comes. The key input supervisory program 70 is used to normally supervise whether or not the operation key 7 is depressed by the user. The LED control program 71 is used to control lighting of the message lamp ML.

Also a BIOS (basic input/output system) 68 as a basic inputting/outputting system is written in the ROM 65. The BIOS 68 is a software program which controls communication (inputting/outputting) of data between the OS or an application program and peripheral apparatus such as the LCDs 41 and 57, keyboard 4 and the HDD 55.

The HDD 55 has an application program, an automatic pilot program, an OS and so forth stored thereon. The OS, automatic pilot program and application program of the HDD 55 are successively stored into the RAM 53 in the boot up (activation) process of the body 2.

The body 2 further includes an LCD controller 77 for controlling the LCD 41 of the display unit 3, a modem 78 for converting data to allow connection to an external network 81, a keyboard controller 61 for controlling the keyboard 4, a touch pad controller 59 for controlling the touch pad 11, and an interface 60 connected to the microphone 15 and the speaker 16 for converting a signal. The LCD controller 77, modem 78, keyboard controller 61, touch pad controller 59 and interface 60 are connected to the external bus 54.

Also an LCD controller 56 is connected to the external bus 54. The LCD controller 56 controls the LCD 57 and a backlight 58. The LCD 57 is disposed rearwardly of the touch pad 11 which is made of a transparent material so that it may pass light of the LCD 57 therethrough. The backlight 58 is disposed rearwardly of the LCD 57 and illuminates the LCD 57.

The keyboard controller 61 connected to the external bus 54 controls inputting from the keyboard 4. The touch pad controller 59 controls inputting from the touch pad 11, left button 12, right button 13 and function button 14.

The interface 60 fetches an input from the internal microphone 15 or supplies an audio signal to the built-in speaker 16.

The modem 78 performs processing of converting the format of an information signal in order to connect the body 2 and the external network 81 to each other to allow communication therebetween.

The LCD controller 77 controls the LCD 41 of the display unit 3 and a backlight 42 disposed on the back of the LCD 41.

The touch pad 11 is disposed on the front side of the keyboard 4 and is used as a pointing device for specifying a position on a screen of the LCD 41 to input a locus of a point. In particular, the pointing device is used to input a locus of movement of an index (pointer) which is displayed on the display screen of the LCD 41 and moved in response to an inputting operation. For the touch pad 11, also a pressure-sensitive touch pad which can detect not only the position of the point but also the strength with which the point is depressed simultaneously may be used. It is to be noted that the pointing device in the present embodiment is not limited to a touch pad, but, for example, a tablet may be used instead.

Now, operation of the portable personal computer 1 when the touch operation section 9 is operated is described with reference to a flow chart of FIG. 3. First in step S1, the CPU 52 discriminates whether or not the function button 14 is operated (turned on) by the user. In particular, when the function button 14 is operated by the user, the touch pad controller 59 outputs an operation signal representing the operation to the CPU 52 over the external bus 54 and the internal bus 50. If it is discriminated in step S1 that the function button 14 is operated, then the CPU 52 sets an extended mode and advances its control to step S6, in which function selection processing is executed. Details of the function selection processing are hereinafter described with reference to a flow chart of FIG. 4.

If it is discriminated in step S1 that the function button 14 is not operated, then the CPU 52 sets a normal operation mode and discriminates in step S2 whether or not the touch pad 11 is operated by the user. In particular, when the touch pad 11 is operated by the user, the touch pad controller 59 detects coordinate data of the operated point of the touch pad 11 and outputs the coordinate data to the CPU 52. If it is discriminated in step S2 that the touch pad 11 is operated (when coordinate data are supplied to the CPU 52 from the touch pad controller 59), the control of the CPU 52 advances to step S7, in which the CPU 52 executes processing corresponding to the inputted coordinate data.

For example, if the user draws upwardly or downwardly the right end of the touch pad 11 while the backlight 42 and the LCD 41 of the display unit 3 are driven by the LCD controller 77 and a predetermined image is displayed on the LCD 41 illuminated by the backlight 42, then the CPU 52 causes the image displayed on the LCD 41 to be moved (scrolled) in the upward or downward direction. If the user draws leftwardly or rightwardly along the lower end of the touch pad 11, then the CPU 52 causes the image displayed on the LCD 41 to be moved (scrolled) in the leftward or rightward direction. What processing should be performed by the CPU 52 when the user operates the touch pad 11 depends upon the application program which is being currently executed by the CPU 52.

If it is discriminated in step S2 that there is no input from the touch pad 11, then the control advances to step S3, in which the CPU 52 discriminates whether or not the left button 12 or the right button 13 is operated. If the left button 12 or the right button 13 is operated by the user, then the touch pad controller 59 outputs an operation signal representing the operation to the CPU 52. When the operation signal is inputted to the CPU 52, the CPU 52 interprets, in step S8, a significance of the operation signal based on the application program being executed and executes processing similar to that which is executed when the left button or the right button of a mouse is operated.

If it is discriminated in step S3 that the left button 12 or the right button 13 is not operated, then the control advances to step S4, in which the LCD controller 56 discriminates whether or not image data to be displayed is supplied thereto from the CPU 52. When image data to be displayed is received, the control advances to step S5, in which the LCD controller 56 outputs the image data supplied thereto from the CPU 52 to the LCD 57 so that the image data may be displayed on the LCD 57. Naturally, the LCD controller 56 thereupon controls the backlight 58 to be lit so that the LCD 57 may be illuminated from behind. Although the touch pad 11 is disposed on the upper face of the LCD 57, since it is formed from a transparent material, the user can visually observe the image displayed on the LCD 57 disposed below (behind) the touch pad 11 through the touch pad 11.

If it is discriminated in step S4 that image data to be displayed is not supplied from the CPU 52 or when the data displaying processing in step S5 comes to an end, the control returns to step S1 so that the processing in steps beginning with step S1 as described above is thereafter executed repetitively.

In this manner, when the function button 14 is not on, the user can perform an inputting operation similar to that performed to a conventional personal computer using the touch pad 11. For example, when the user operates the touch pad 11 with a pen not shown while a predetermined application is operating on the CPU 52, coordinate data of the operation is supplied to the CPU 52 in step S7. Thereupon, the CPU 52 outputs the coordinate data corresponding to the input to the LCD controller 77 so that a locus drawn with the pen is displayed on the LCD 41.

When the CPU 52 controls in such a manner as just described above, the locus displayed on the LCD 41 is supplied as data to be displayed to the LCD controller 56. Thereupon, the LCD controller 56 outputs the inputted image data to the LCD 57 so that the image data may be displayed on the LCD 57. Consequently, the locus same as the locus displayed on the LCD 41 is displayed also on the LCD 57.

Figure 3:
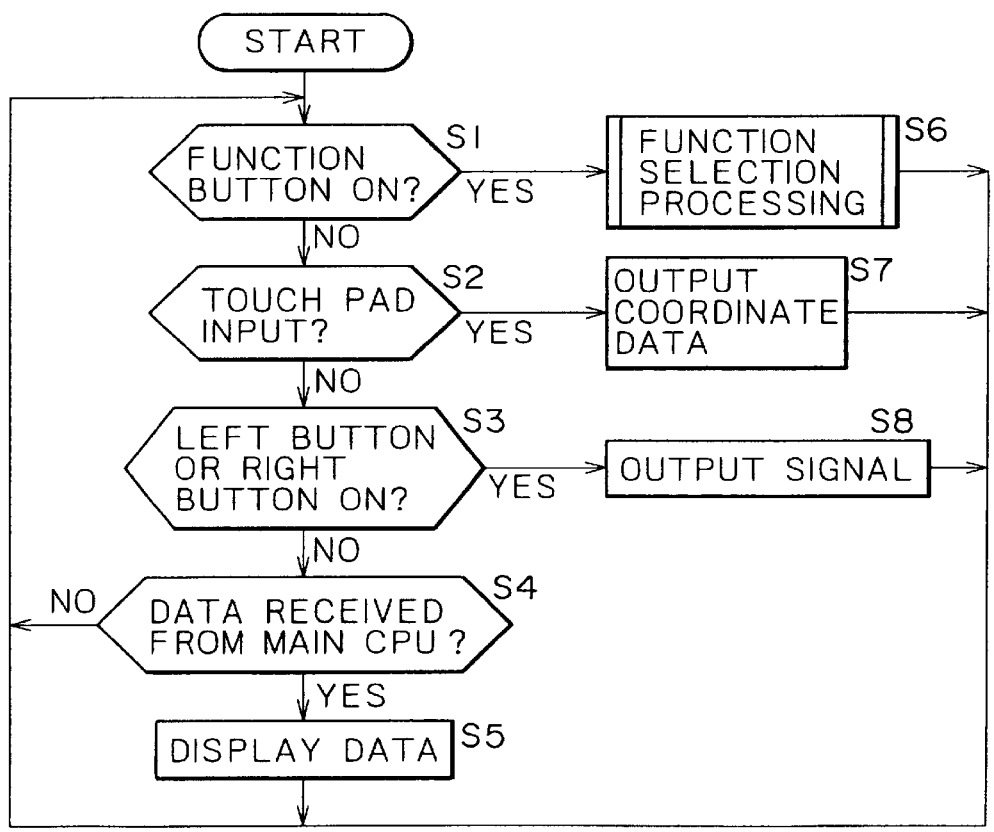
FIG. 3 is a flow chart illustrating operation of portable personal computer of FIG. 1.

Details of the function selection processing in step S6 of FIG. 3 are described below with reference to a flow chart of FIG. 4. This processing is started when the user operates (turns on) the function button 14 as described hereinabove.

Figure 5:
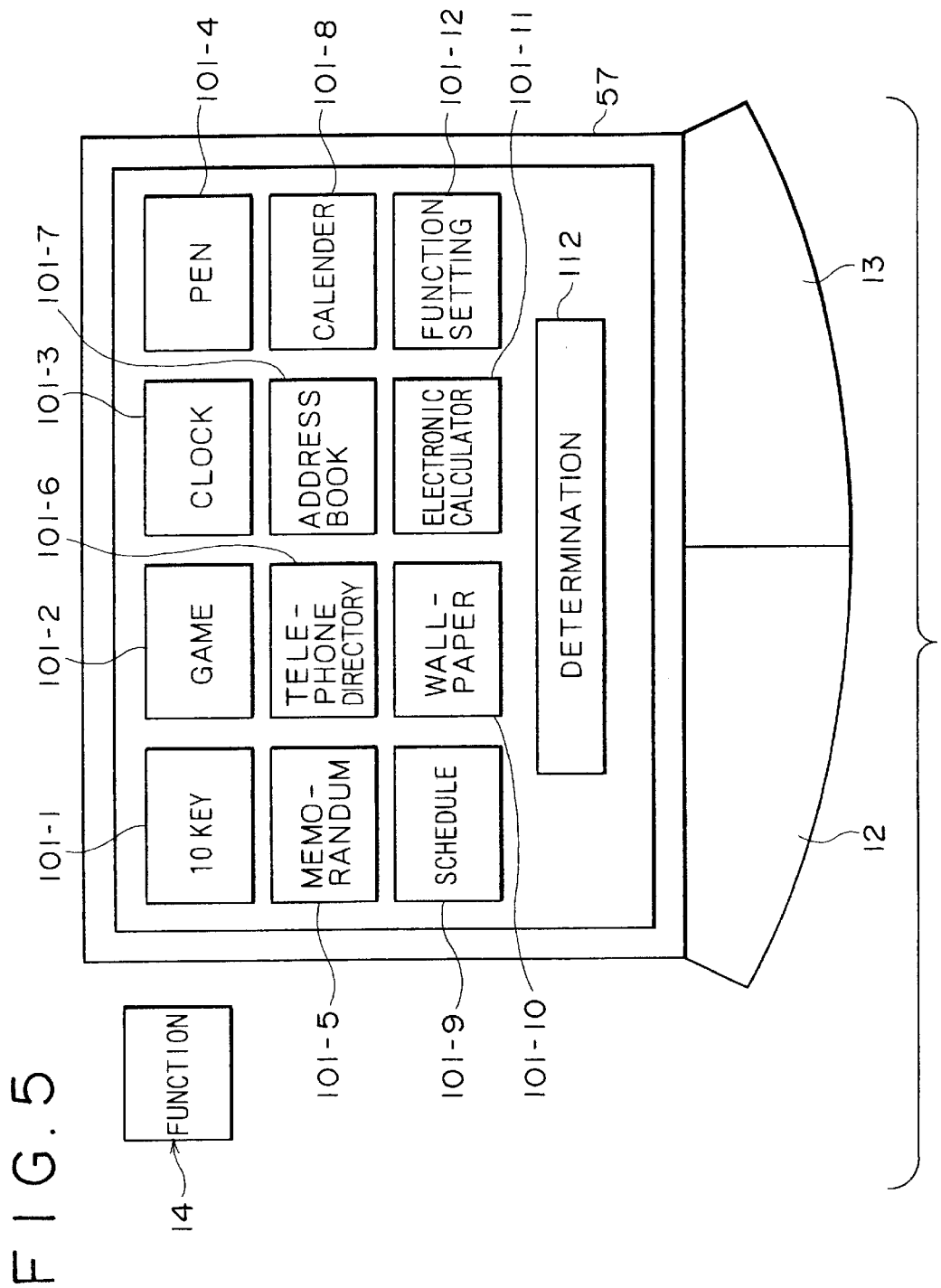
FIGS. 5 to 8 are diagrammatic views showing different examples of a display of an LCD (liquid crystal display device) shown in FIG. 2.

In step S11, the CPU 25 controls the LCD 57 through the LCD controller 56 to display a menu screen for allowing the user to select various functions. FIG. 5 shows an example of a display of such a menu screen as just described. In the display example shown, selection buttons for selecting various functions such as a ten key button 101-1, a game button 101-2, a clock button 101-3, a pen button 101-4, a memorandum button 101-5, a telephone directory button 101-6, an address book button 101-7, a calendar button 101-8, a schedule button 101-9, a wallpaper button 101-10, an electronic calculator button 101-11 and a function setting button 101-12 are displayed, and a determination button 112 which is operated in order to settle (determine) selection when one of the selection buttons is selected is displayed.

Each of the buttons from the ten key button 101-1 to the electronic calculator button 101-11 is operated in order to select a corresponding one of the functions from the ten key function to the electronic calculator function. The function setting button 101-12 is operated in order to effect detailed setting of any function or in order to change the contents of a menu.

In step S12, the CPU 52 discriminates whether or not one of the selection buttons from the ten key button 101-1 to the function setting button 101-12 is operated. If no selection button is operated, then the control advances to step S13, in which the CPU 52 discriminates whether or not the function button 14 is operated (turned off) again. If the function button 14 is not operated, then the control returns to step S12, in which the CPU 52 discriminates whether or not any of the selection buttons is operated. When it is discriminated in step S13 that the function button 14 is operated again while the menu screen is displayed, the control advances to step S21, in which the CPU 52 controls the LCD controller 56 to erase the menu screen displayed on the LCD 57.

If it is discriminated in step S12 that one of the selection buttons is operated, then the control advances to step S14, in which the CPU 52 controls the LCD controller 56 so that one of the selection buttons displayed on the LCD 57 which has been selected is displayed in a highlight. For example, if the ten key button 101-1 from among the twelve selection buttons shown in FIG. 5 is operated, then the ten key button 101-1 is displayed in a highlight. Then, if the user pushes the position at which the ten key button 101-1 is displayed with a finger, then coordinate data of the position is detected by the touch pad 11 and supplied to the CPU 52 through the touch pad controller 59. The CPU 52 compares the inputted coordinate data with coordinates of the selection buttons displayed on the LCD 57 to determine which one of the selection buttons is operated.

Then in step S15, the CPU 52 discriminates whether or not the determination button 112 is operated. If the determination button 112 is not operated, then the control advances to step S16, in which the CPU 52 discriminates whether or not some other selection button is operated. If it is discriminated that some other selection button is operated, then the control returns to step S14, in which the CPU 52 causes the newly selected selection button to be displayed in a highlight in place of the selection button which has been displayed in a highlight till then.

If it is discriminated in step S16 that any other selection button is not operated, then the control advances to step S17, in which the CPU 52 discriminates whether or not the function button 14 is operated again (turned off). If the function button 14 is not operated, the control returns to step S15, in which the CPU 52 discriminates whether or not the determination button 112 is operated again. If it is discriminated in step S17 that the function button 14 is operated, since the menu screen is being displayed, the CPU 52 determines that the operation is an instruction to end the displaying processing and advances its control to step S21, in which it causes the menu displaying processing to be ended.

Figure 6:
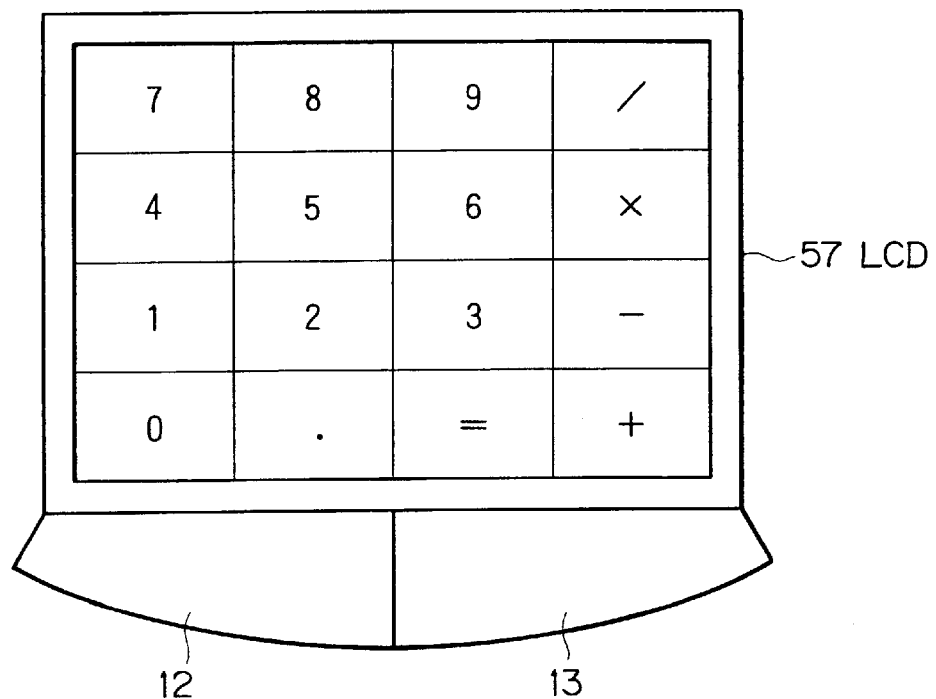

If the CPU 52 discriminates in step S15 that the determination button 112 is operated, then the control advances to step S18, in which the CPU 52 controls the LCD controller 56 to display an image corresponding to the selected selection button to be displayed on the LCD 57. For example, if the determination button 112 is operated while the ten key button 101-1 is displayed in a highlight in step S14, then an image of ten keys is displayed as seen in FIG. 6 on the LCD 57. Thus, in step S19, the user can execute a predetermined function based on the image displayed in step S18. For example, if such an image as shown in FIG. 6 is displayed on the LCD 57, the user can operate the ten keys to input a numeral. In particular, when the user operates the touch pad 11 to perform predetermined inputting based on the image displayed on the LCD 57, the touch pad 11 outputs a signal corresponding to the input to the CPU 52.

In step S20, the CPU 52 discriminates whether or not the function button 14 is operated (turned off). If the function button 14 is not operated, then the control returns to step S19, in which the CPU 52 continues the execution processing of the selected function. If it is discriminated in step S20 that the function button 14 is operated during the execution processing of the selected function, then the CPU 52 returns the control to step S11, in which it controls the LCD 57 to display such a menu screen as shown in FIG. 5.

Figure 7:
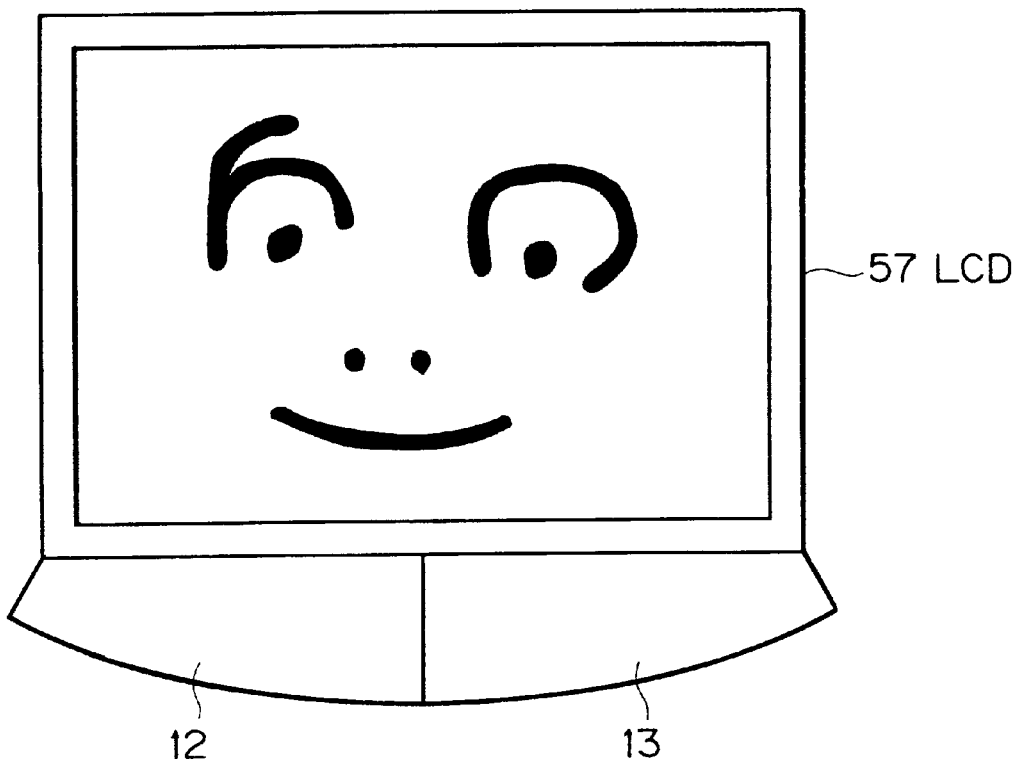

If the pen button 101-4 is selected, then the CPU 52 sets a pen inputting mode in step S19 and causes, when the user draws on the touch pad 11 using the pen, the drawn locus to be displayed on the LCD 57, for example, as shown in FIG. 7. If the inputted locus is subject to character recognition, then, for example, the user can input a hand-written character.

Figure 8:
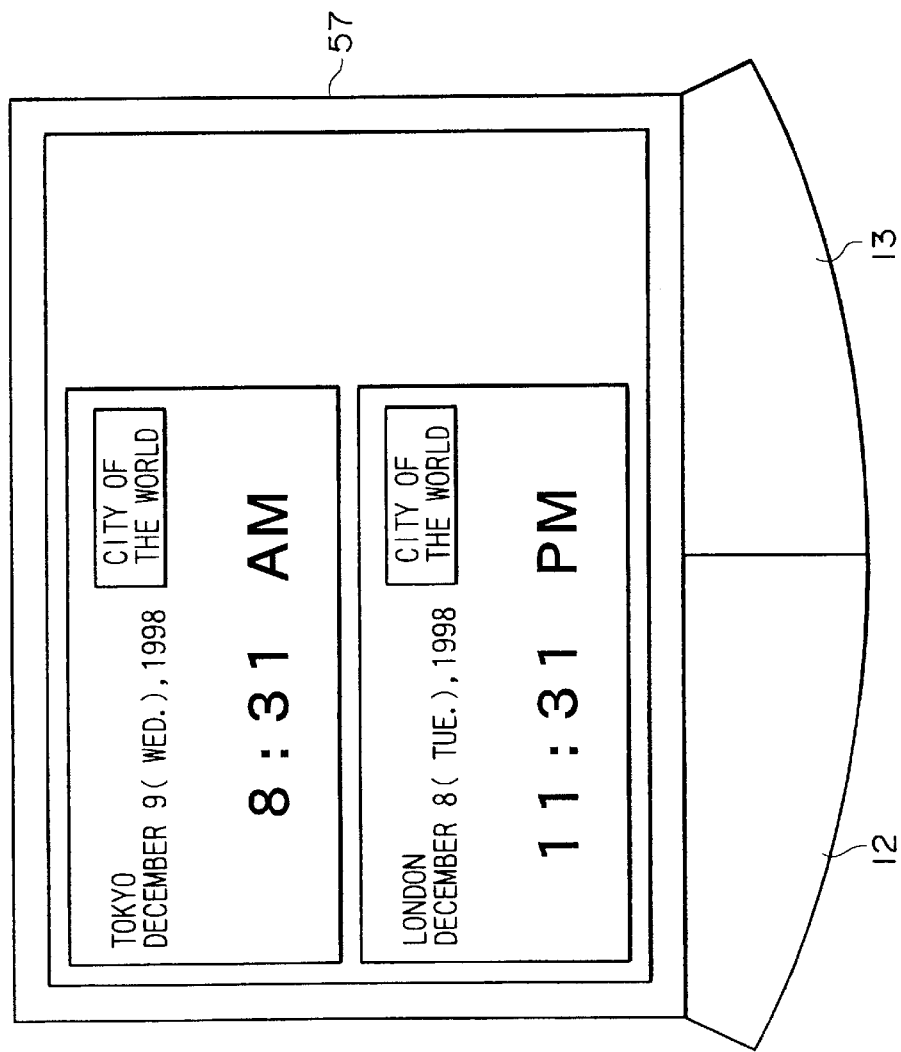

If the clock button 101-3 is selected, then, for example, such an image which represents the time at present as shown in FIG. 8 is displayed on the LCD 57. The time at present is counted by the RTC 62. Details of the processing in this instance are further described with reference to a flow chart of FIG. 9.

Figure 4:
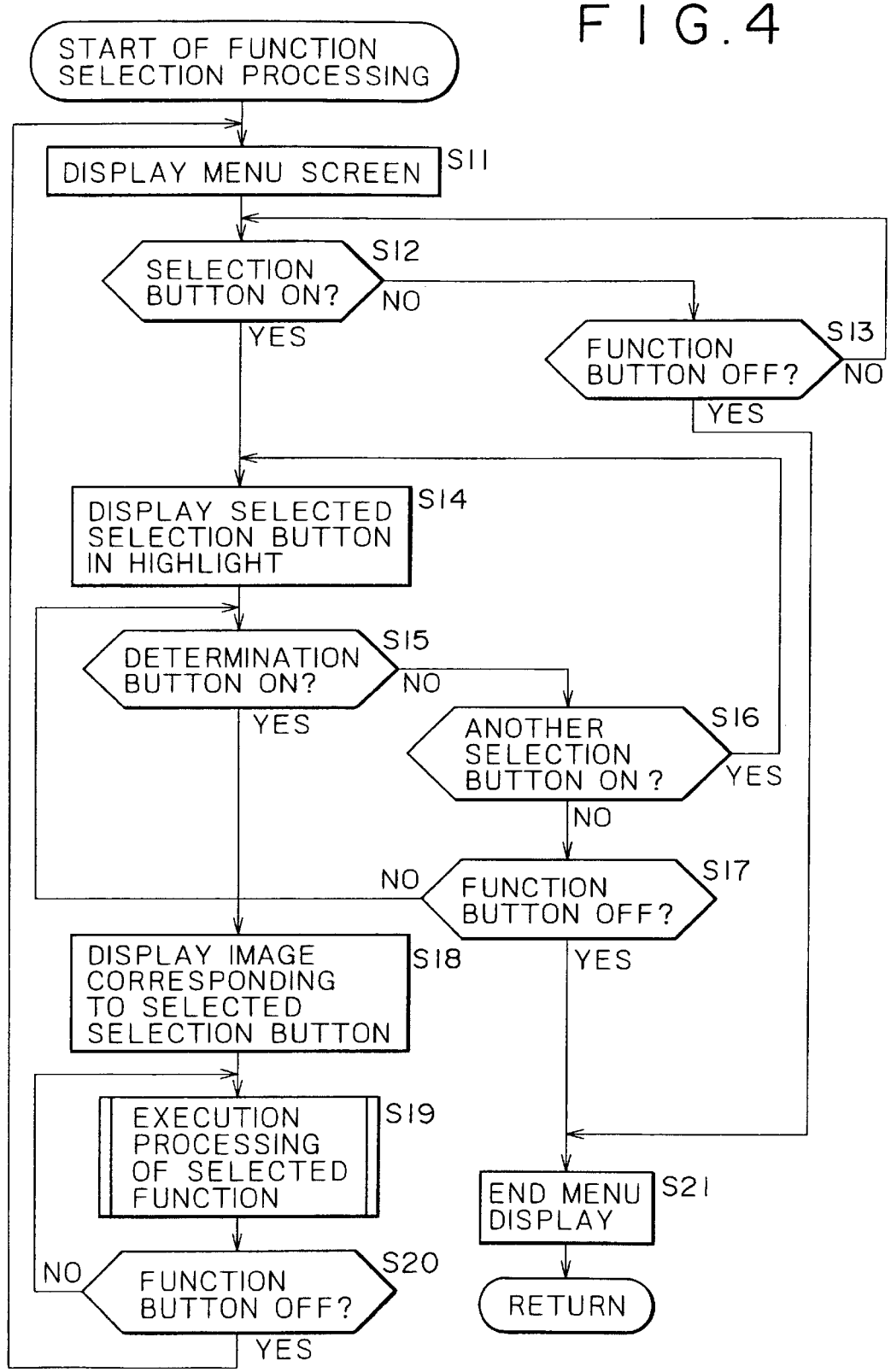
FIG. 4 is a flow chart illustrating details of function selection processing in a step shown in FIG. 3.
Figure 9:
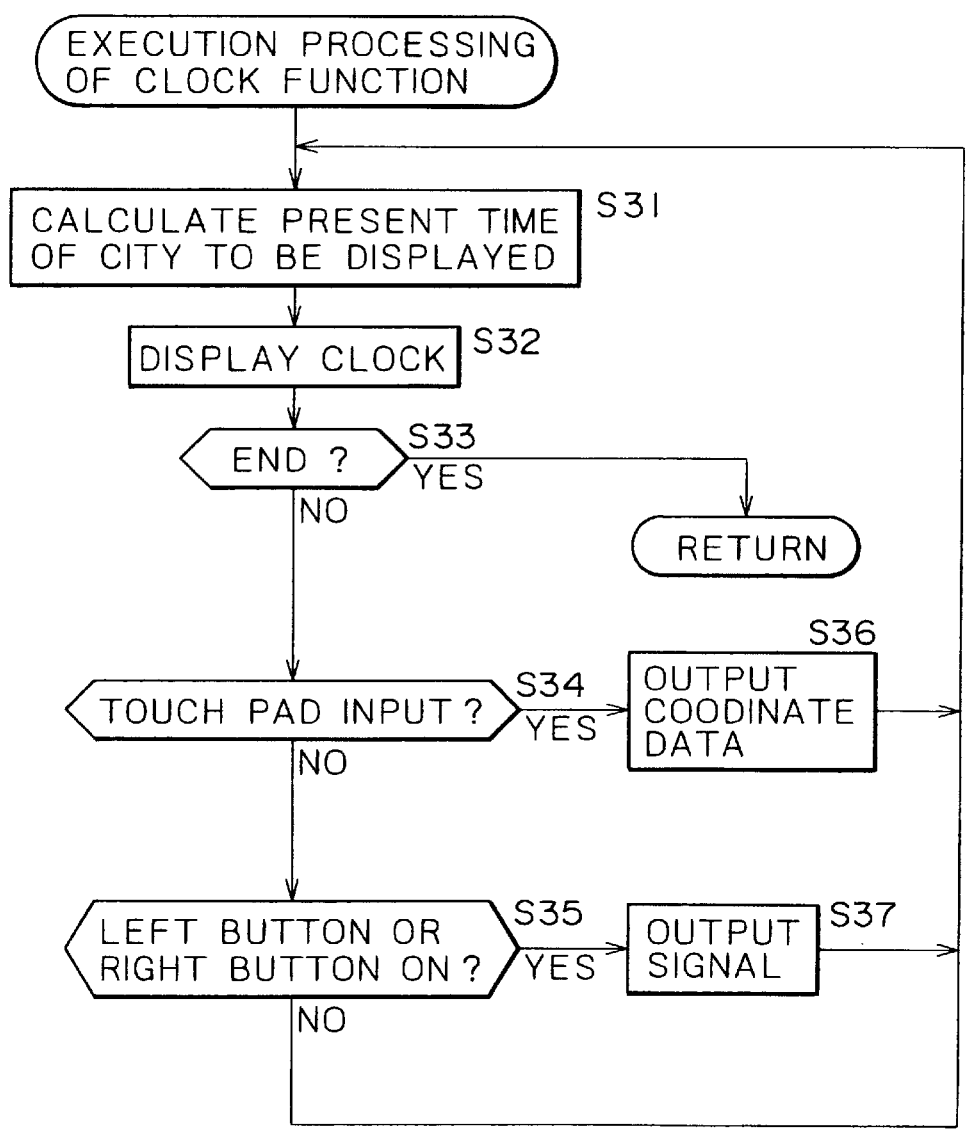
FIG. 9 is a flow chart illustrating a process of a clock function of the portable personal computer of FIG. 1.

In particular, when the clock button 101-3 is selected, the processing illustrated in the flow chart of FIG. 9 is executed in steps S19 and S20 of FIG. 4. First in step S31 of FIG. 9, the CPU 52 reads a present time outputted from the RTC 62 through the CPU 52 and determines the present time as a present time of a city of destination of the portable personal computer 1 (in the example shown, the city is Tokyo). Further, the CPU 52 adds or subtracts a predetermined value to or from the present time to calculate a present time for another city (for example, London in the United Kingdom). In step S32, the CPU 52 causes the present time of Tokyo and the present time of London calculated in step S31 to be displayed on the LCD 57, for example, in such a manner as illustrated in FIG. 8.

Then, the control advances to step S33, in which the CPU 52 discriminates whether or not the user operates the function button 14 to input an instruction to end the processing of the clock function. If an instruction to end the processing of the clock function is inputted, then the CPU 52 ends the processing. It is to be noted that the processing in step S33 is the processing represented as the processing in step S20 of FIG. 4. In particular, while it is illustrated in the flow chart of FIG. 4 for the convenience of description that the processing in step S20 and the processing in step S19 are performed independently of each other, actually the processing in step S20 of FIG. 4 is executed in the subroutine in step S19 as seen from the flow chart of FIG. 9.

If it is discriminated in step S33 that an instruction to end the processing is not inputted, then the control advances to step S34, in which the CPU 52 discriminates whether or not the touch pad 11 is operated by the user. If it is discriminated that the touch pad 11 is operated, then the control advances further to step S36, in which the touch pad controller 59 supplies coordinate data to the CPU 52.

If it is discriminated in step S34 that the touch pad 11 is not operated, then the control advances to step S35, in which the touch pad controller 59 discriminates whether or not the left button 12 or the right button 13 is operated. If the left button 12 or the right button 13 is operated, then the touch pad controller 59 outputs a corresponding signal to the CPU 52 in step S37. If it is discriminated in step S35 that the left button 12 or the right button 13 is not operated, then the control returns to step S31 so that the processing in steps beginning with step S31 is thereafter executed repetitively.

Thus, the processes in steps S34 to S37 are substantially similar to the processes in steps S2, S3, S7 and S8. Consequently, when the clock function is executed, the user can operate the touch pad 11 to input coordinate data or can operate the left button 12 or the right button 13. This is because, when the clock displaying function is executed, an operation of selecting something in connection with the function does not occur and, if the user performs some operation, then it should be determined that the touch pad 11, the left button 12 or the right button 13 is operated for the original function thereof and the input should be accepted as such. This augments the operability of the portable personal computer 1.

It is to be noted that, also when the calendar button 101-8 or the wallpaper button 101-10 other than the clock button 101-3 from among the selection buttons from the ten key button 101-1 to the function setting button 101-12 shown in FIG. 5 is selected and a corresponding function is executed, it is permitted similarly to input coordinate data from the touch pad 11 or to operate the left button 12 or the right button 13.

When the calendar button 101-8 is operated, a calendar including the present time is displayed on the LCD 57. On the other hand, when the wallpaper button 101-10 is operated, a predetermined image (wallpaper image) set in advance is displayed on the LCD 57. When the wallpaper button 101-10 is operated to select the predetermined wallpaper, since the wallpaper is displayed on the LCD 57 if the function button 14 is not operated, the user will operate on the touch pad 11 (LCD 57), on which the wallpaper is displayed, with a finger to input predetermined coordinate data from the touch pad 11.

Figure 10:
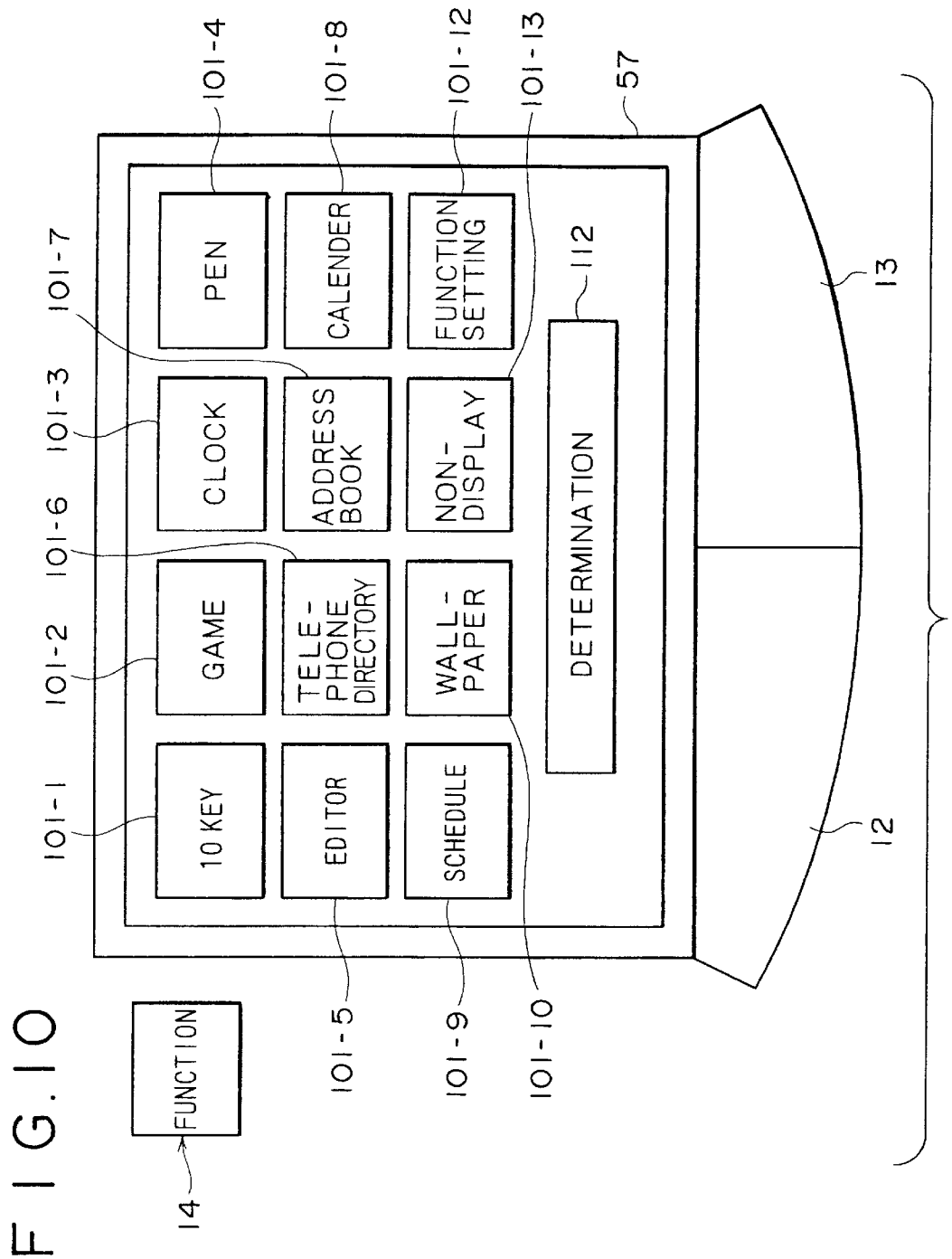
FIG. 10 is a diagrammatic view showing a different example of a display of the LCD shown in FIG. 2.

In the foregoing description, when it is intended to display the menu screen, the function button 14 is operated (turned on), but when it is intended to erase the menu screen, the function button 14 is operated again (turned off). However, for example, if a non-display button 101-13 is displayed on the menu screen as shown in FIG. 10 by operating the function setting button 101-12, then it is possible to display such a menu screen as shown in FIG. 10 on the LCD 57 when the function button 14 is operated, but erase the display of the menu screen when the non-display button 101-13 is operated while the menu screen is displayed.

Figure 11:
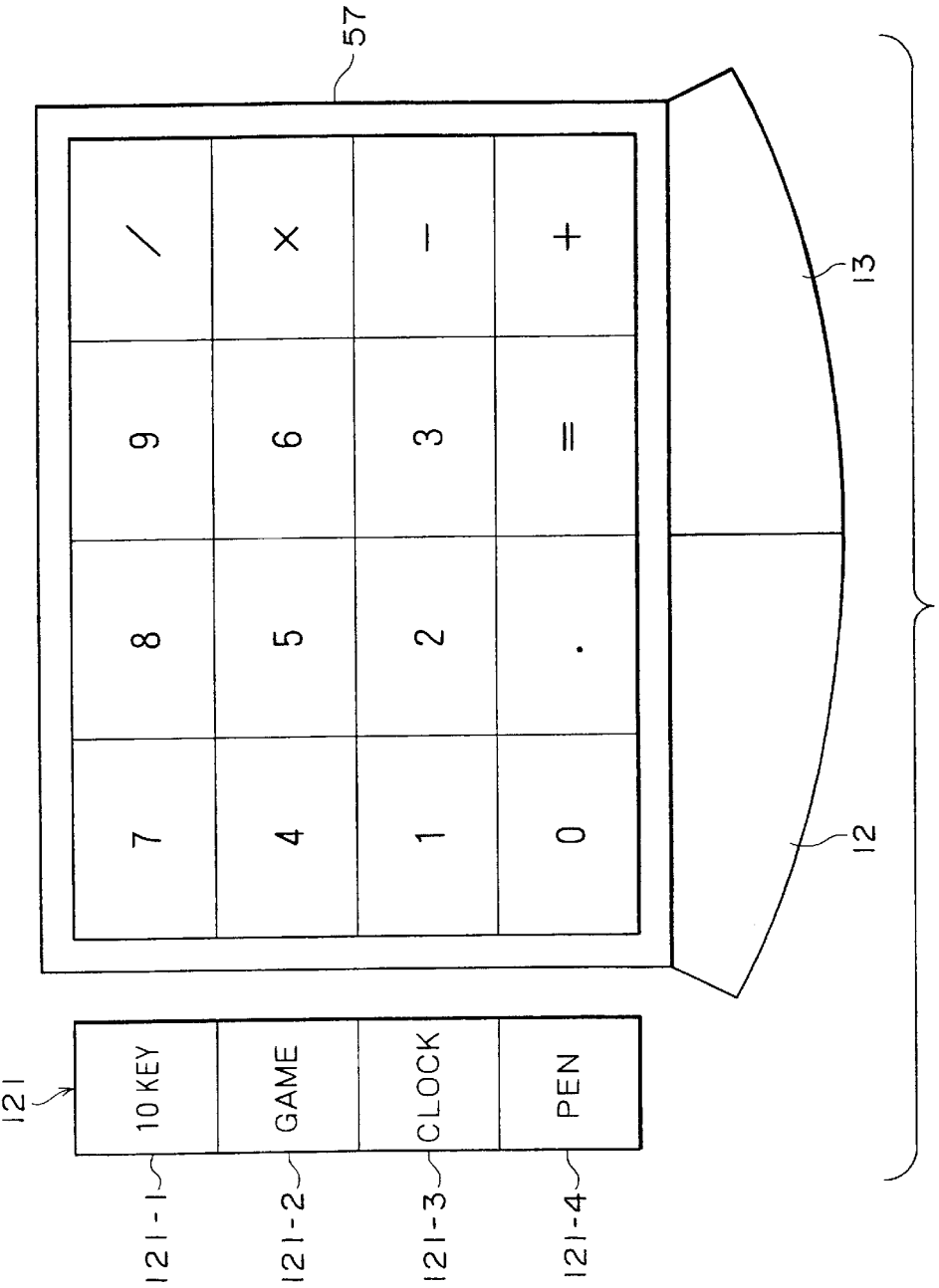
FIG. 11 is a diagrammatic view showing another different example of a display of the LCD shown in FIG. 2 which includes different function buttons.

Further, while, in the foregoing description, the menu screen is displayed when the function button 14 is operated, for example, buttons 121 corresponding to various functions may be provided in advance, for example, as shown in FIG. 11. In the example shown in FIG. 11, a ten key function button 121-1, a game function button 121-2, a clock function button 121-3 and a pen function button 121-4 are provided. The function buttons 121 from the ten key function button 121-1 to the pen function button 121-4 are formed on the portable personal computer 1 in place of the function button 14 shown in FIG. 1. If, for example, the ten key function button 121-1 is operated, then an image of ten keys is displayed on the LCD 57 as seen in FIG. 11. If the clock function button 121-3 is operated, then such an image of a clock as shown in FIG. 7 is displayed on the LCD 57.

Figure 12:
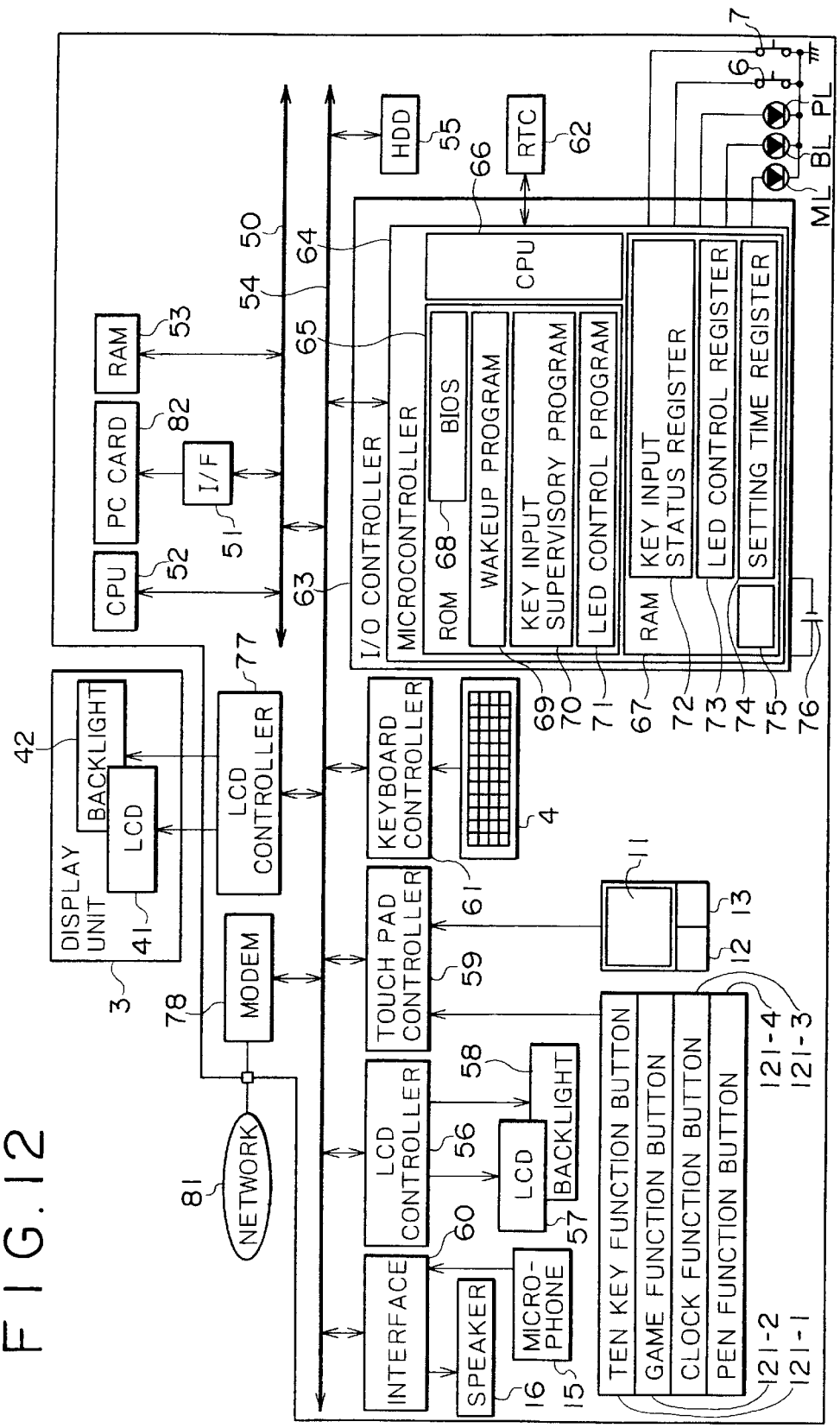
FIG. 12 is a block diagram showing a modified internal construction of the portable personal computer of FIG. 1 where the function buttons of FIG. 11 are provided.

In this instance, the portable personal computer 1 is modified such that outputs of the function buttons 121 from the ten key function button 121-1 to the pen function button 121-4 are supplied to the touch pad controller 59 as seen in FIG. 12. Except this, the modified portable personal computer 1 shown in FIG. 12 is similar to that shown in FIG. 2.

In order to erase an image of a function displayed once in the display example of FIG. 11, a corresponding one of the function buttons 121 is operated again.

Figure 13:
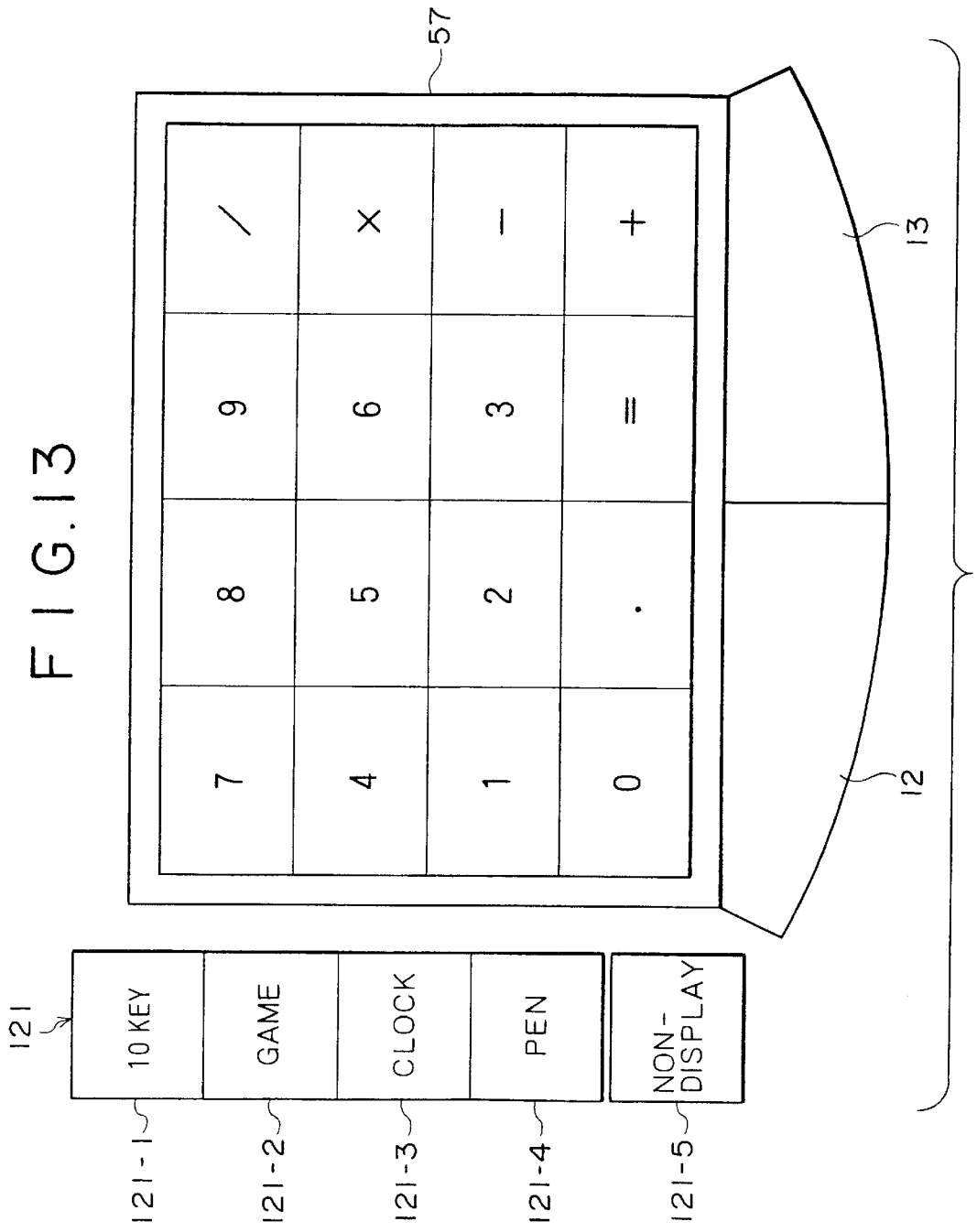
FIG. 13 is a diagrammatic view showing a further different example of a display of the LCD shown in FIG. 2 which includes different function buttons.

Alternatively, however, for example, a non-display function button 121-5 may be provided which is operated in order to erase an image of a function displayed on the LCD 57 as seen in FIG. 13. Where the non-display function button 121-5 is provided, in order to erase an image of a predetermined function when it is displayed, the user will operate the non-display function button 121-5.

Figure 14:
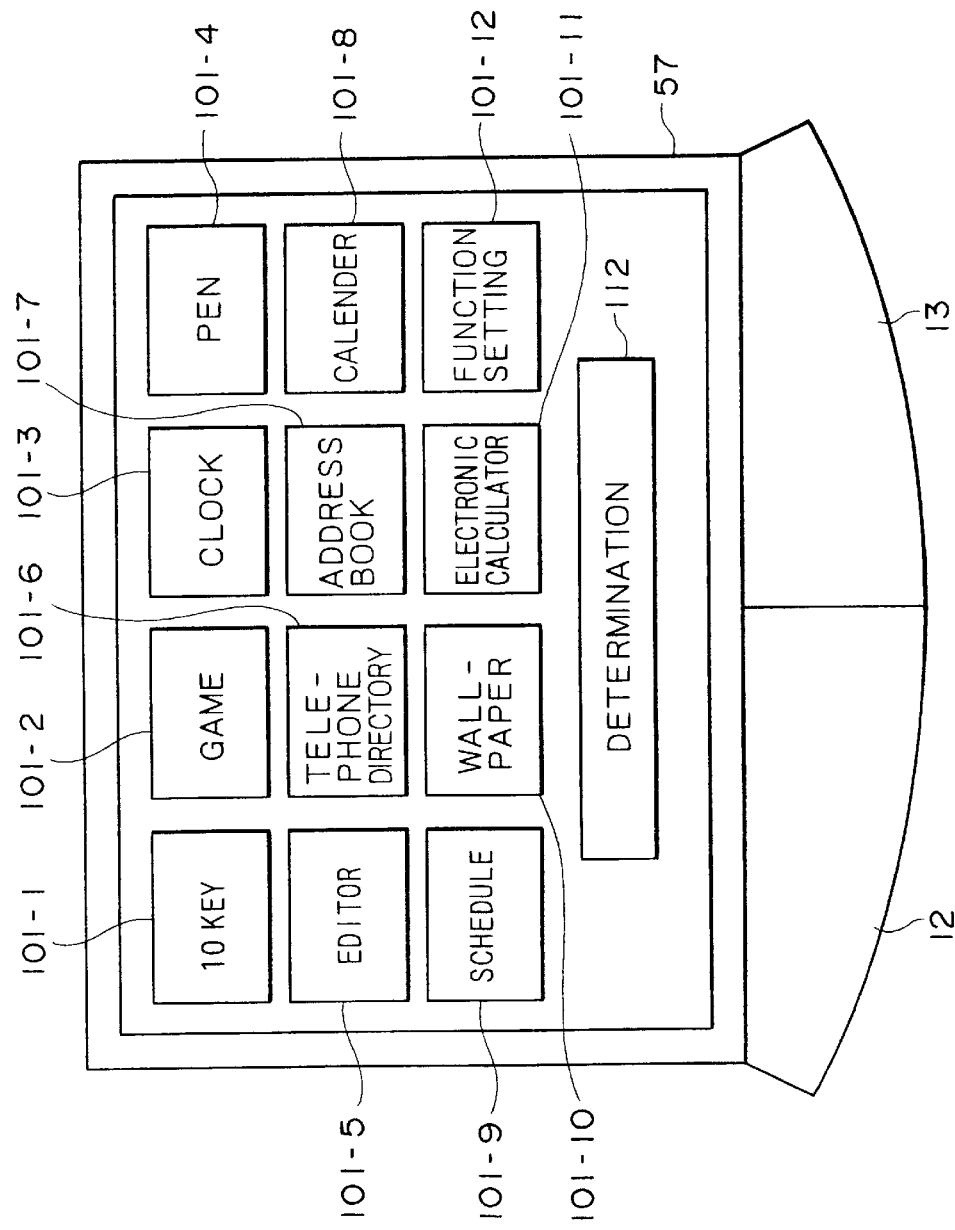
FIG. 14 is a diagrammatic view showing a still further different example of a display of the LCD shown in FIG. 2.

Further alternatively, a button to be operated in order to display an image of a menu on the LCD 57 or erase an image of a menu or a function being displayed may be allocated to a predetermined key (shortcut key) of the keyboard 4. In this instance, when a key to which displaying of a menu image is allocated is operated, such a menu image as shown in FIG. 14 is displayed on the LCD 57, and when a key for erasing the display of the menu image, the menu image is erased.

Figure 15:
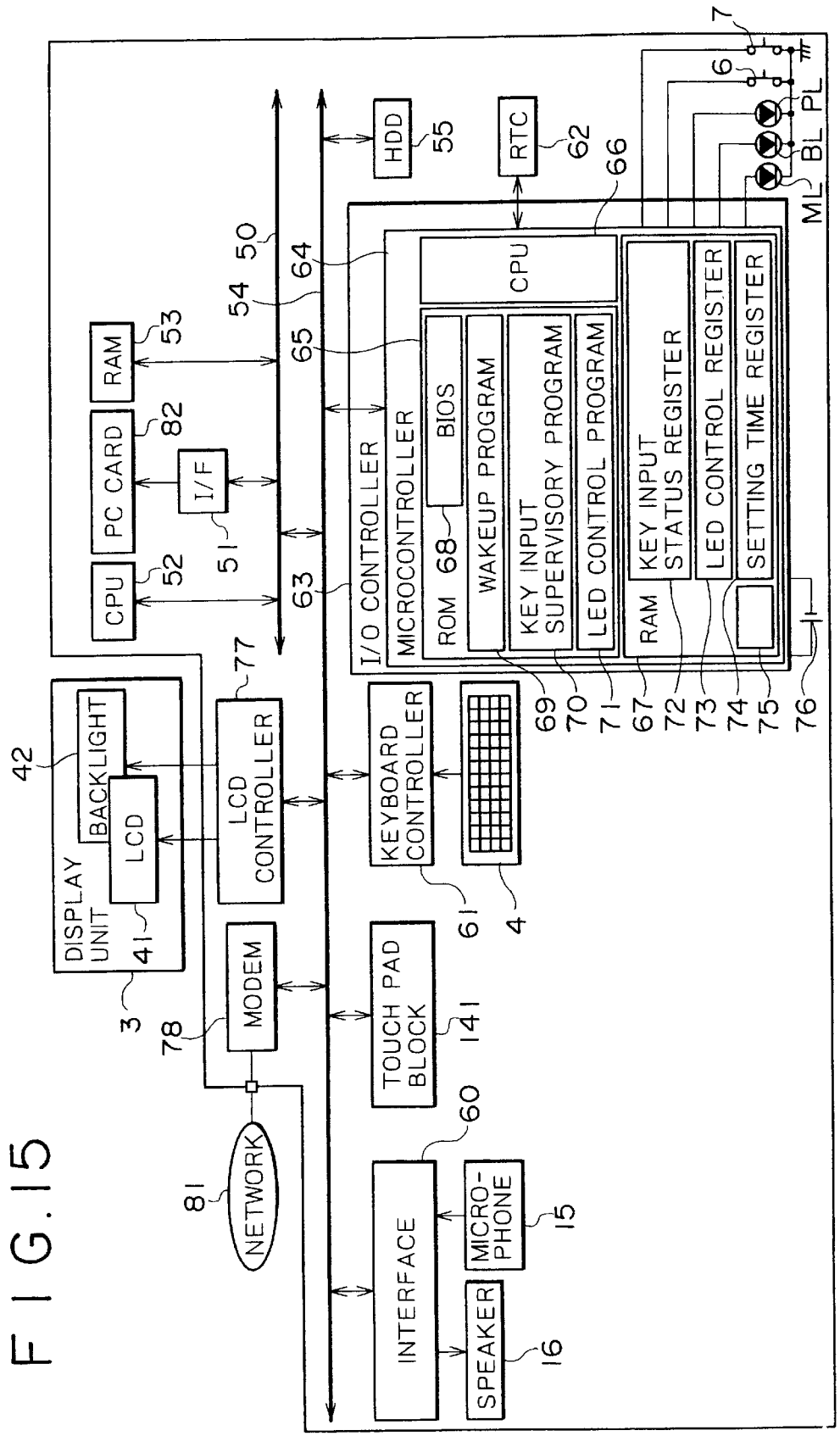
FIG. 15 is a block diagram showing another modified internal construction of the portable personal computer of FIG. 1.

In the example of FIG. 2, the LCD controller 56, LCD 57, backlight 58, touch pad controller 59, touch pad 11, left button 12, right button 13, function button 14 and so forth are disposed separately from one another. However, they may be accommodated collectively in a block. FIG. 15 shows an example of an internal construction where the arrangement just described is employed. Referring to FIG. 15, in the construction example shown, a touch pad block 141 is connected to the external bus 54. The construction of the other part of the body 2 is similar to that in FIG. 2 except that the LCD controller 56, LCD 57, backlight 58, touch pad controller 59, touch pad 11, left button 12, right button 13, function button 14 and so forth are omitted.

Figure 16:
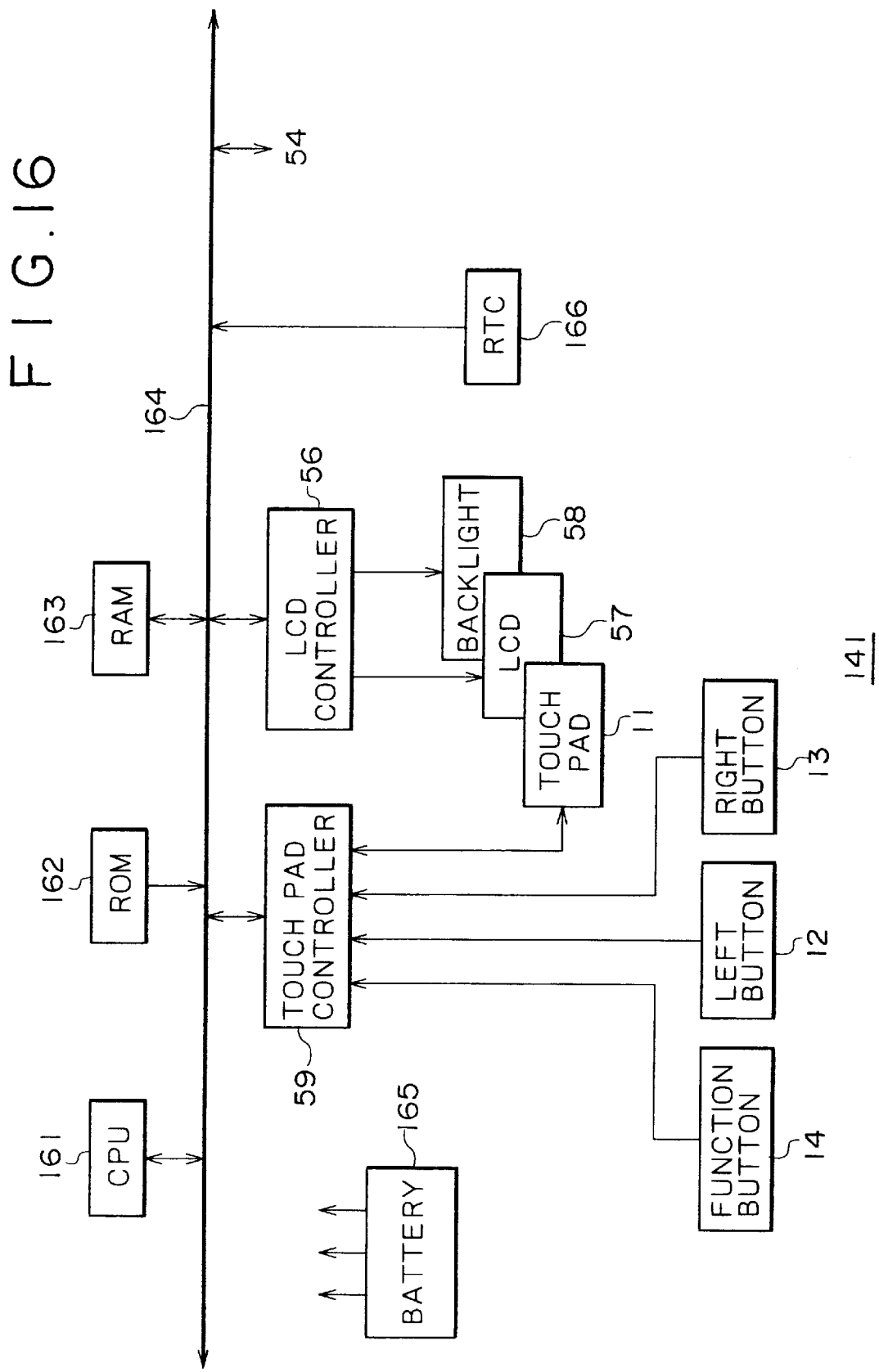
FIG. 16 is a block diagram showing an example of an internal construction of a touch pad block shown in FIG. 15.

FIG. 16 shows an example of an internal construction of the touch pad block 141. Referring to FIG. 16, a CPU 161 executes various processes in accordance with a program stored in a ROM 162. A program to be executed by the CPU 161, data and so forth are suitably stored into a RAM 163. The CPU 161, ROM 162 and RAM 163 are connected to each other by an internal bus 164. Also the touch pad controller 59, the LCD controller 56 and a RTC 166 are connected to the internal bus 164. The touch pad controller 59 outputs coordinate data corresponding to an input from the touch pad 11 and outputs a signal corresponding to an operation of the left button 12, right button 13 or function button 14.

The LCD controller 56 controls the backlight 58 and the LCD 57. The LCD 57 is disposed behind the touch pad 11 similarly as described above. The RTC 166 performs a time counting operation and outputs time information. A battery 165 supplies necessary power to the components of the touch pad block 141. Accordingly, the touch pad block 141 can be used even when the power supply to the body 2 is off or the OS of the CPU 52 or the CPU 66 is not operating. The internal bus 164 is connected to the external bus 54.

It is to be noted that power may be supplied not from the battery 165 but from backup battery 76 on the body 2 side to the touch pad block 141. However, also in this instance, even if the body 2 side is substantially in an inoperative condition, the touch pad block 141 can be used by itself.

Also where the touch operation section 9 is formed as a block in this manner, operation of it is executed in such a manner as illustrated in FIGS. 3 and 4 similarly as described hereinabove. However, the processing of it is executed not by the CPU 52 of the body 2, but by the CPU 161 of in the touch pad block 141.

For example, the CPU 161 in the touch pad block 141 discriminates in step S1 of FIG. 3 whether or not the function button 14 is operated, and if the function button 14 is operated, then the control advances to step S6, in which the CPU 161 executes function selection processing. In particular, the CPU 161 executes the processing in steps S11 to S21 of the flow chart of FIG. 4 described hereinabove. Since the details of the processing are similar to those described hereinabove, overlapping description of them is omitted here to avoid redundancy.

If it is discriminated in step S1 that the function button 14 is not operated, then the CPU 161 discriminates in step S2 whether or not the touch pad 11 is operated, and if the touch pad 11 is operated, then the CPU 161 executes the coordinate data outputting processing in step S7. In particular, if the touch pad 11 is operated, then the touch pad controller 59 outputs coordinate data corresponding to the operation. The CPU 161 outputs the coordinate data to the CPU 52 of the external bus 54 over the internal bus 164 and the external bus 54.

If it is discriminated in step S2 that the touch pad 11 is not operated, then the CPU 161 discriminates in step S3 whether or not the left button 12 or the right button 13 is operated, and if the left button 12 or the right button 13 is operated, then the CPU 161 executes the signal outputting processing in step S8. In particular, when the left button 12 or the right button 13 is operated, the touch pad controller 59 outputs a signal corresponding to the operation. The CPU 161 outputs the operation signal to the CPU 52 over the internal bus 164 and the external bus 54.

If it is discriminated in step S3 that the left button 12 or the right button 13 is not operated, then the control advances to step S4, in which the CPU 161 discriminates whether or not data to be displayed is supplied thereto from the main CPU 52. If data to be displayed is supplied, then the control advances to step S5, in which the CPU 161 stores the data supplied thereto from the CPU 52 once into the RAM 163 and then reads out and supplies the data suitably to the LCD 57 through the LCD controller 56 so that the data may be displayed on the LCD 57.

If it is discriminated in step S4 that data to be displayed is not supplied from the CPU 52, then the processing in step S5 is skipped, and the control returns to the processing in step S1 so that the processing in steps beginning with step S1 is repetitively executed.

Also where the construction shown in FIG. 10, 11, 13 or 14 is adopted, the touch operation section 9 can be formed as a block.

Figure 17:
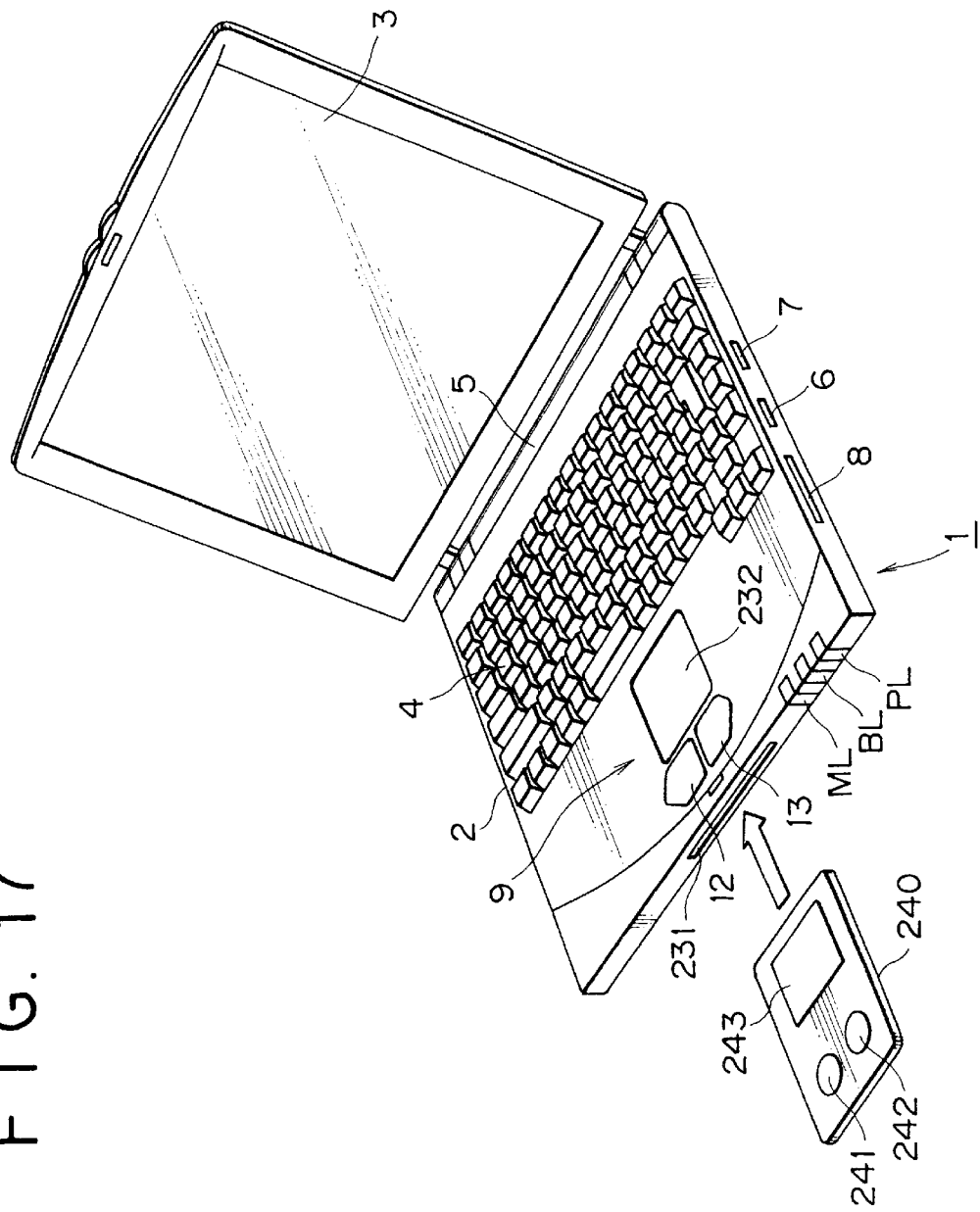
FIG. 17 is a perspective view showing an another appearance of the portable personal computer of FIG. 1.

While, in the foregoing description, the touch pad 11 is formed integrally with (inseparably from) the body 2, it may be formed otherwise as a PC card of a separate member. FIG. 17 shows a construction of the portable personal computer 1 wherein the touch pad 11 is formed as a PC card. Referring to FIG. 17, in the construction example shown, the portable personal computer 1 has a slot 231 formed in a front end wall of the body 2 thereof in the proximity of the face on which the left button 12 and the right button 13 are disposed so that the user can insert a PC card 240 into the slot 231. The PC card 240 has a left button 241 and a right button 242 provided thereon such that, when it is loaded into the body 2 through the slot 231, the left button 241 is positioned below the left button 12 of the body 2 and the right button 242 is positioned below the right button 13. Consequently, when the user operates the left button 12, the left button 241 is operated, but when the right button 13 is operated, the right button 242 is operated. At the location in which the touch pad 11 is formed in the embodiment of FIG. 1, a hole 232 is formed such that, when the PC card 240 is loaded into the body 2 through the slot 231, a touch pad 243 of the PC card 240 is exposed to the outside through the hole 232 so that the user can operate the touch pad 243 through the hole 232.

Figure 18:
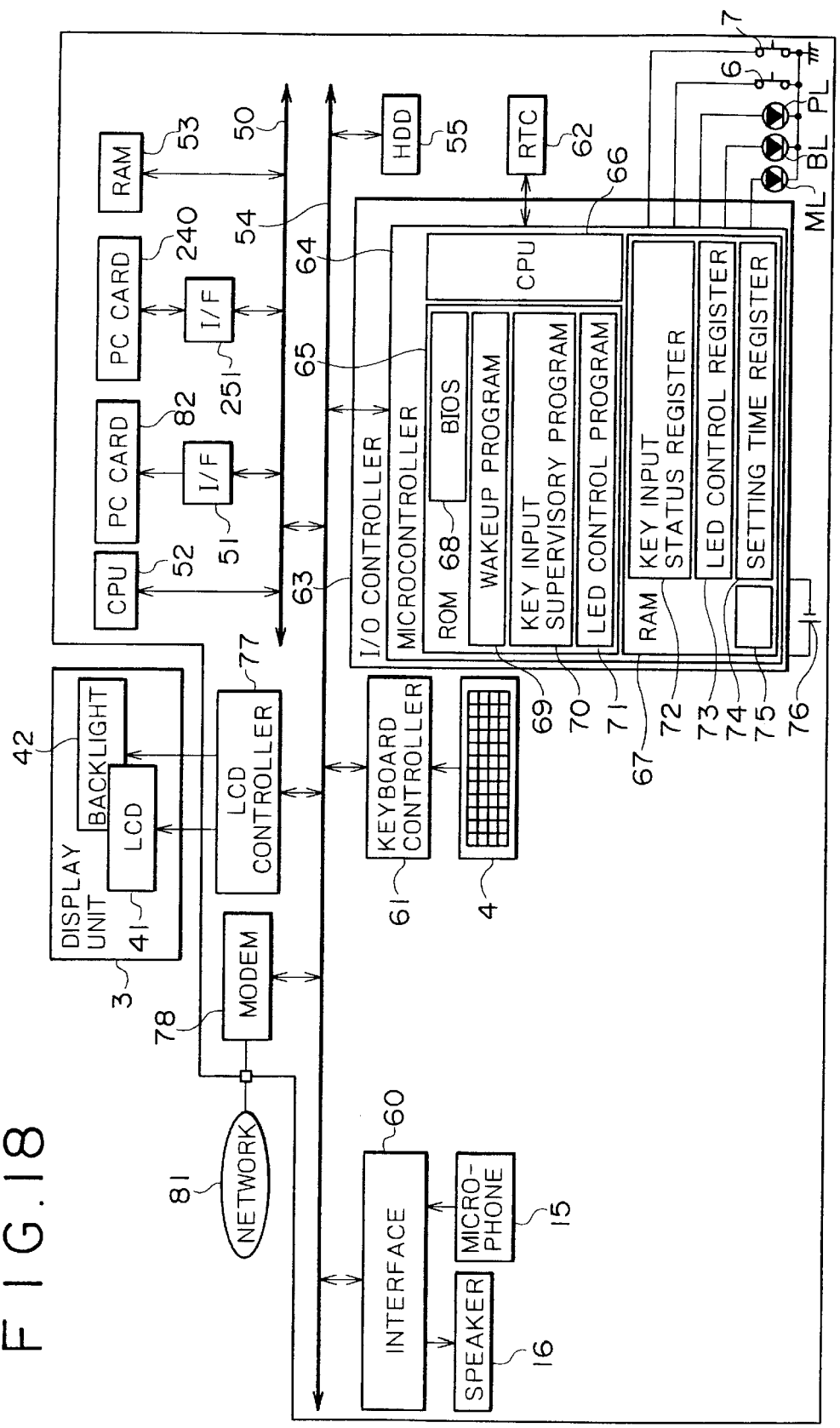
FIG. 18 is a block diagram showing an example of an internal construction of the portable personal computer of FIG. 17.

FIG. 18 shows an example of an internal construction of the portable personal computer 1 shown in FIG. 17. Referring to FIG. 18, in the construction example shown, the LCD controller 56, LCD 57, backlight 58, touch pad controller 59, touch pad 11, left button 12, right button 13 and function button 14 shown in FIGS. 2 and 12 are omitted.

Instead, in the example of FIG. 18, when the PC card 240 is loaded into the body 2, it is connected to the internal bus 50 through a interface 251. The construction of the other part of the internal construction of the body 2 is similar to that shown in FIG. 2 or 12.

Figure 19:
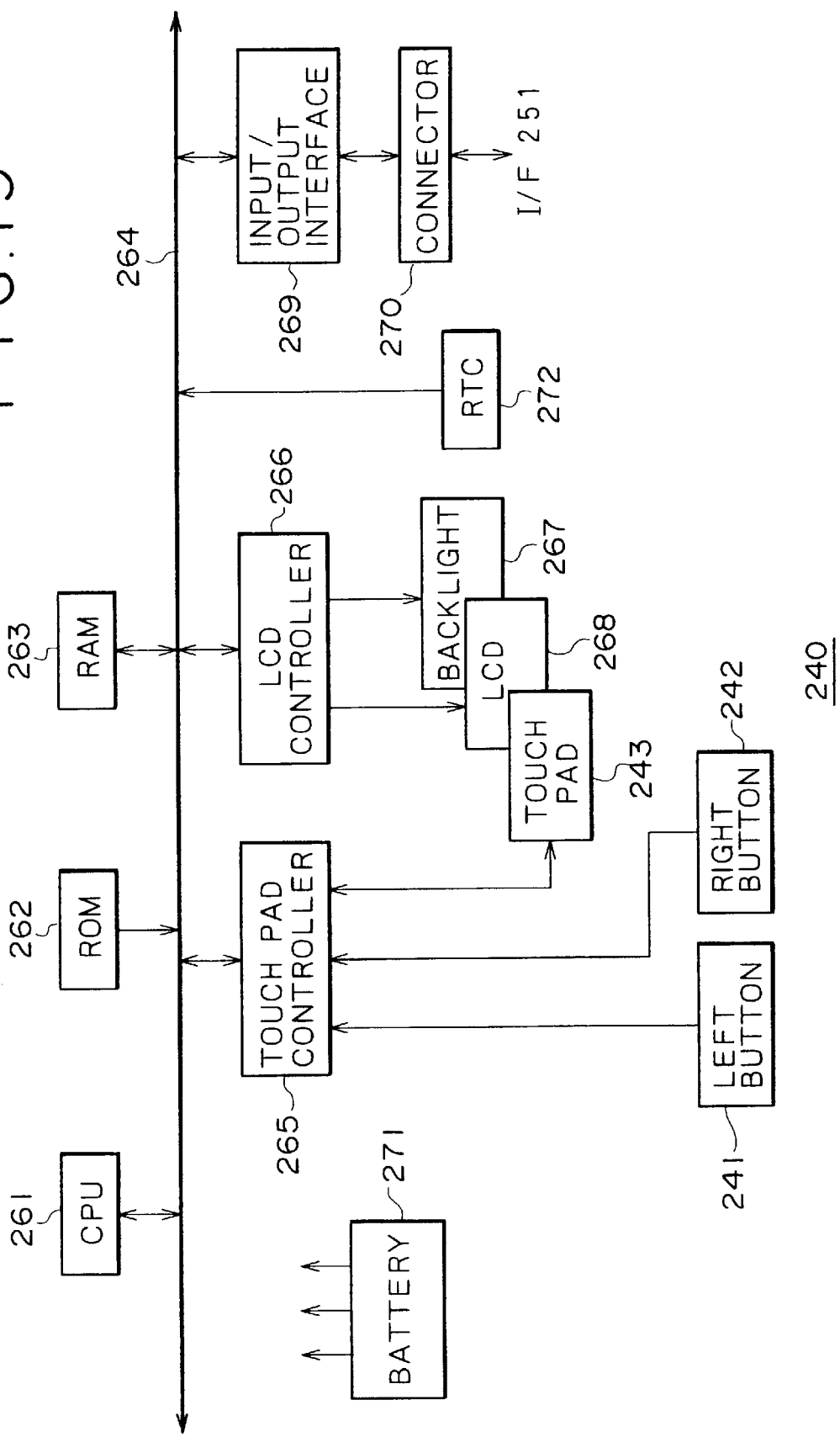
FIG. 19 is a block diagram showing an example of an internal construction of a PC card shown in FIG. 17.

FIG. 19 shows an example of an internal construction of the PC card 240. A CPU 261 executes various processes in accordance with a program stored in a ROM 262. A program and data necessary for the CPU 261 to perform various processes are suitably stored into a RAM 263. Outputs of the left button 241 and the right button 242 are supplied to a touch pad controller 265. When the touch pad 243 is operated, the touch pad controller 265 detects coordinate data of the operated position. An LCD controller 266 controls an LCD 268 to display a predetermined image and drives a backlight 267 disposed behind the LCD 268 to illuminate the LCD 268. Although the LCD 268 is disposed behind the touch pad 243, since the touch pad 243 is formed from a transparent material similarly to the touch pad 11, the user can visually observe an image of the LCD 268 through the touch pad 243.

An RTC 272 outputs time information. A connector 270 is connected to the interface 251, and an input/output interface 269 executes interface processing between the connector 270 and the CPU 261. The CPU 261, ROM 262, RAM 263, touch pad controller 265, LCD controller 266, RTC 272 and input/output interface 269 are connected to each other by an internal bus 264. A battery 271 supplies necessary power to the components of the PC card 240.

Figure 20:
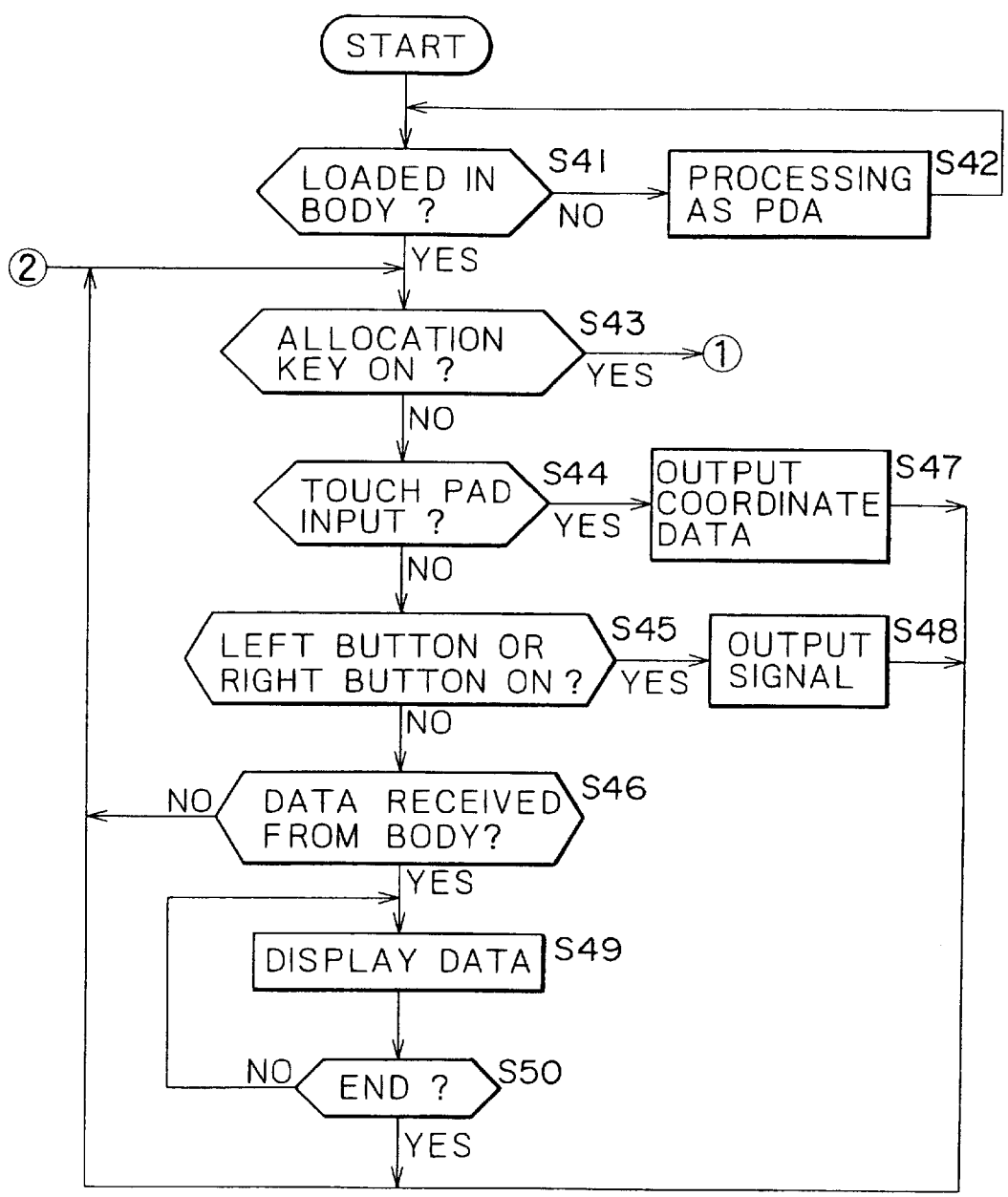
FIG. 20 is a flow chart illustrating operation of the PC card shown in FIG. 17.
Figure 21:
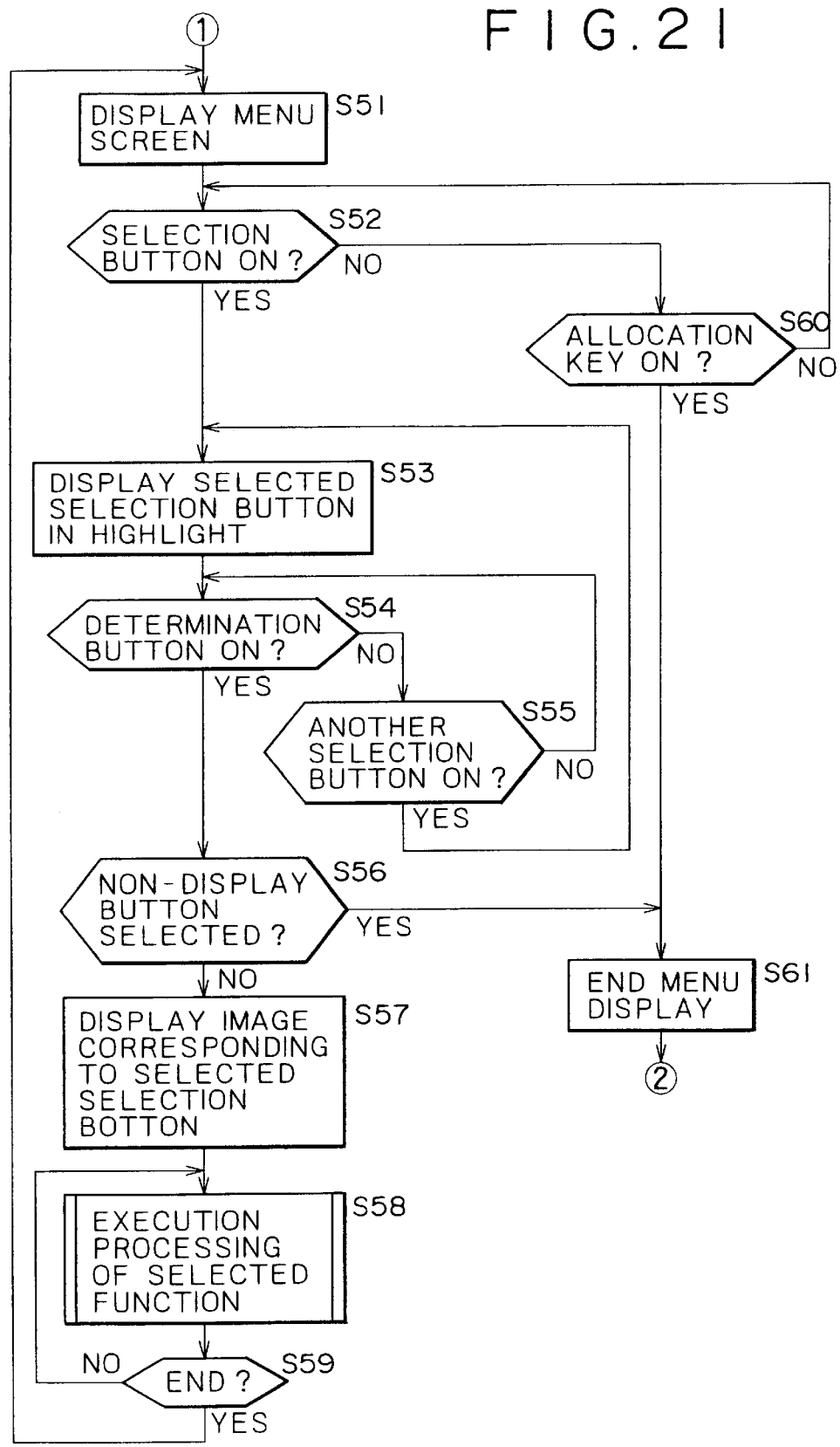
FIG. 21 is a flow chart illustrating operation of the PC card shown in FIG. 17.

Subsequently, operation of the PC card 240 is described with reference to flow charts of FIGS. 20 and 21. First in step S41, the CPU 261 of the PC card 240 discriminates whether or not the PC card 240 is loaded in the body 2. Whether or not the PC card 240 is loaded in the body 2 can be discriminated from whether or not the PC card 240 can communicate with the CPU 52 of the body 2 through the connector 270. If it is discriminated in step S41 that the PC card 240 is not loaded in the body 2, then the control advances to step S42, in which the CPU 261 executes processing as a PDA (Personal Digital Assistant).

For example, if the user operates the touch pad 243 using a pen, then coordinate data of the operation are supplied to the CPU 261 through the touch pad controller 265. The CPU 261 outputs a locus corresponding to the coordinate data to the LCD 268 through the LCD controller 266 so that the locus may be displayed on the LCD 268. Consequently, the user can confirm the locus inputted using the pen with the eyes. When the user inputs a predetermined character with the pen, the CPU 261 performs character recognition processing based on the inputted coordinate data and controls the LCD controller 266 to display the character as a result of the recognition on the LCD 268. If the user observes the character displayed as a result of the recognition and determines that the character is wrong, then the user may perform inputting again to input suitable character information. Then, when a predetermined instruction is inputted, the CPU 261 supplies the character data inputted in this manner to the RAM 263 so that the character data may be stored into the RAM 263.

The data stored in the RAM 263 are backed up by the battery 271. Consequently, even if the PC card 240 is used in a condition wherein it is disconnected from the body 2, the data are not lost. Further, since the battery 271 supplies necessary power to the components of the PC card 240, even if the PC card 240 is separate or isolated from the body 2, the user can use the PC card 240 so that it may function as a PDA. Further, even if the PC card 240 is loaded in the body 2 or the power supply on the body 2 side is off or else the OS on the body 2 side is not operating, the PC card 240 can be used by itself.

If it is discriminated in step S41 that the PC card 240 is loaded in the body 2, then the control advances to step S43, in which the CPU 261 discriminates whether or not a predetermined key allocated in advance on the keyboard 4 is operated. In particular, if the predetermined key of the keyboard 4 is operated, then the keyboard controller 61 of the body 2 outputs a signal corresponding to the operated key to the CPU 52. The CPU 52 outputs a signal representative of the inputted key to the PC card 240 through the interface 251.

In the PC card 240, the signal supplied thereto from the CPU 52 of the body 2 is received by the CPU 261 through the connector 270 and the input/output interface 269. The CPU 261 discriminates from the received signal what the operated key is.

If it is discriminated in step S43 that the predetermined allocation key is not operated, then the control advances to step S44, in which the CPU 261 discriminates whether or not the touch pad 243 is operated. If the touch pad 243 is operated, then the control advances to step S47, in which the CPU 261 executes processing of outputting coordinate data corresponding to the operation. In particular, when the touch pad 243 is operated, the touch pad controller 265 outputs coordinate data corresponding to the operated position. The CPU 261 outputs the coordinate data to the body 2 through the input/output interface 269 and the connector 270.

In the body 2, the CPU 52 receives the coordinate data through the interface 251 and executes processing corresponding to the coordinate data. In particular, the CPU 52 thereupon can execute processing similar to that executed when the touch pad 11 of FIG. 1 is operated.

If it is discriminated in step S44 that the touch pad 243 is not operated, then the control advances to step S45, in which the CPU 261 discriminates whether or not the left button 241 or the right button 242 is operated. If the left button 241 or the right button 242 is operated, then the control advances to step S48, in which the CPU 261 executes processing of outputting a corresponding signal.

In particular, if the user operates the left button 12 or the right button 13 shown in FIG. 17, then the left button 241 or the right button 242 disposed below them is operated. Accordingly, the touch pad controller 265 of the PC card 240 thereupon outputs a signal representing that the left button 241 or the right button 242 is operated. The CPU 261 outputs the operation signal to the body 2 side through the input/output interface 269 and the connector 270.

On the body 2 side, the CPU 52 receives the operation signal from the PC card 240 through the interface 251 and executes processing corresponding to the operation. In particular, also in this instance, processing similar to that executed when the left button 12 or the right button 13 shown in FIG. 1 is operated is executed.

If it is discriminated in step S45 that the left button 241 or the right button 242 is not operated, then the control advances to step S46, in which the CPU 261 discriminates whether or not data to be displayed is transmitted thereto from the CPU 52 of the body 2. If data to be displayed is transmitted from the CPU 52, then the control advances to step S49, in which the CPU 261 receives the data through the connector 270 and the input/output interface 269 and controls the LCD controller 266 to display the data on the LCD 268. The display of the data received from the body 2 continues until the user inputs an instruction to end the display in step S50. If it is discriminated in step S46 that data to be displayed is not transmitted from the body 2, or if it is discriminated in step S50 that an instruction to end the display of the data supplied from the body 2 is issued, then the control returns to step S43 so that the processing in steps beginning with step S43 is thereafter executed repetitively.

If it is discriminated in step S43 that the predetermined one of the keys of the keyboard 4 to which the function of causing the function selection menu to be displayed is operated, then the control advances to step S51, in which the CPU 261 controls the LCD controller 266 so that, for example, such a menu screen as shown in FIG. 22 may be displayed on the LCD 268. In the display example shown in FIG. 22, a transfer button 101-14 is displayed in place of the function setting button 101-12 of the function section buttons from the ten key button 101-1 to the function setting button 101-12 shown in FIG. 10.

Then in step S52, the CPU 261 discriminates whether or not one of the selection buttons from the ten key button 101-1 to the transfer button 101-14 is operated. In particular, if the user operates the touch pad 243, then coordinate data of the operation is outputted from the touch pad controller 265, and therefore, the CPU 261 can perform the discrimination processing of whether or not a selection button is operated by comparing the coordinate data with the coordinate data of the buttons displayed on the LCD 268. If none of the selection buttons is operated, then the control advances to step S60, in which it is discriminated whether or not a predetermined key allocated to end displaying processing of the menu screen is operated. If the predetermined key is not operated, then the control returns to step S52 so that the processing in steps beginning with step S52 is thereafter preformed repetitively. When it is discriminated in step S60 that the key to which the function of ending the displaying processing of the menu screen is allocated is operated, the control advances to step S61, in which the CPU 261 ends the menu displaying processing. In particular, the CPU 261 controls the LCD controller 266 to erase the menu screen of the LCD 268. Thereafter, the control returns to step S43 so that the processing in steps beginning with step S43 is thereafter executed repetitively.

If it is discriminated in step S52 that one of the selection buttons is operated, then the control advances to step S53, in which the CPU 261 controls the LCD controller 266 so that the selection button operated from among the selection buttons displayed on the LCD 268 may be displayed in a highlight. For example, if the transfer button 101-14 is operated when such a menu screen as shown in FIG. 22 is displayed, then the transfer button 101-14 is displayed in a highlight.

Then in step S54, the CPU 261 discriminates whether or not the determination button 112 is operated. If the determination button 112 is not operated, then the control advances to step S55, in which it is discriminated whether or not some other selection button is operated. If some other selection button is operated, then the control returns to step S53, in which the newly operated selection button is displayed in a highlight in place of the button which has been displayed in a highlight till then. If it is discriminated in step S55 that no other selection button is operated, then the control returns to step S54, in which it is discriminated again whether or not the determination button 112 is operated.

If it is discriminated in step S54 that the determination button 112 is operated, then the control advances to step S56, in which it is discriminated whether or not the currently selected button (the button currently displayed in a highlight) is the non-display button 101-13. If the currently selected button is the non-display button 101-13, then the control advances to step S61, in which the CPU 261 executes menu displaying processing. Thereafter, the control returns to step S43 to repeat the processing in steps beginning with step S43.

If it is discriminated in step S56 that the currently selected button is not the non-display button 101-13, then the control advances to step S57, in which the CPU 261 controls the LCD controller 266 to output an image corresponding to the currently selected selection button to the LCD 268 so that the image may be displayed on the LCD 268. Then in step S58, the CPU 261 performs processing of executing a predetermined function based on the image displayed on the LCD 268.

For example, if the user operates the transfer button 101-14, then the operation signal is transmitted from the touch pad controller 265 to the CPU 261. Thereupon, the CPU 261 reads out the data stored in the RAM 263 (the data having been stored in the processing in step S42 of FIG. 20) and transfers the data to the body 2 side through the input/output interface 269 and the connector 270. The CPU 52 on the body 2 side receives the data and stores the data into the RAM 53. Consequently, data inputted to the PC card 240 while the PC card 240 is disconnected from the body 2 or data recorded into the PC card 240 when the power supply to the body 2 is off or the OS on the body 2 side is not operating although the PC card 240 is loaded in the body 2 are transferred from the PC card 240 to the body 2 side and stored into the RAM 53 of the body 2 side.

The processing in step S58 is repetitively executed until it is discriminated in step S59 that an instruction to end the execution processing of the selected function is inputted by the user. If it is discriminated in step S59 that an instruction to end the processing of the selected function is inputted by the user, then the CPU 261 ends the execution processing of the selected function. Thereafter, the control returns to step S51, in which the CPU 261 executes the menu screen displaying processing. Then, processing similar to that described above is repeated.

As described above, in the present embodiment, since the PC card 240 can be operated independently of the body 2 side, even when the power supply to the body 2 is off or the OS of the body 2 is not operating, the PC card 240 can be normally kept in an operating condition. Consequently, the PC card 240 can autonomously execute various functions (for example, such a functions as a scheduler or an electronic pet growing game) without depending upon the operation condition of the body 2 side.

In the foregoing description, the keyboard 4 can be used only for inputting on the body 2 side. However, the keyboard 4 may be constructed otherwise so that it can be used also for inputting on the PC card 240 side.

Further, while the function selection buttons are displayed on the touch pad 57 or 268 on the touch pad 11 or 243 side, program selection buttons such as, for example, icons may be displayed instead.

While preferred embodiments of the present invention have been described using specific terms, such description is for illustrative purposes only, and it is to be understood that changes and variations may be made without departing from the spirit or scope of the following claims.

What is claimed is:

1. An information processing apparatus, comprising:
    first inputting means for inputting at least alphanumeric data;
    first processing means for processing the data from said first inputting means;
    first displaying means coupled to said first processing means for displaying information;
    storage means coupled to said first processing means for storing data;
    second displaying means coupled to said first processing means for displaying information according to the data stored in said storage means; and
    second inputting means for detecting coordinates data and controlling a pointer on said first displaying means, said second inputting means being disposed on a front side of said second displaying means in such a manner as to allow the information displayed on said second displaying means to be visually observed through said second inputting means.

2. An information processing apparatus according to claim 1, wherein said first processing means controls, in an extended mode, said second displaying means to display a menu of functions and executes the function corresponding to coordinates inputted from said second inputting means.

3. An information processing apparatus according to claim 2, wherein said first processing means executes the function selected from the menu and controls said second displaying means to display an image corresponding to the function selected from the menu.

4. An information processing apparatus according to claim 3, wherein the image includes numerical keys and said first processing means processes coordinates data as a number corresponding to a numerical key inputted from said second inputting means.

5. An information processing apparatus according to claim 3, wherein the image includes an image regarding time.

6. An information processing apparatus according to claim 3, wherein the image includes a calendar.

7. An information processing apparatus according to claim 3, wherein the image includes a schedule book.

8. An information processing apparatus according to claim 3, wherein the image includes an electronic calculator.

9. An information processing apparatus according to claim 2, wherein said first displaying means displays an image corresponding to the function selected from the menu.

10. An information processing apparatus according to claim 1, further comprising a physical key for displaying a menu of functions on said second displaying means,
    wherein said first processing means executes the function corresponding to coordinates inputted from said second inputting means and controls said second displaying means to display an image corresponding to the function selected from the menu.

11. An information processing apparatus according to claim 1, further comprising a physical function key, wherein said first processing means executes, when said physical function key is operated, the function and controls said second displaying means to display an image corresponding to the function.

12. An information processing apparatus, comprising:
    first inputting means for inputting at least alphanumeric data;
    first processing means for processing the data from said first inputting means;
    first displaying means coupled to said first processing means for displaying information;
    first storage means coupled to said first processing means for storing data;
    second processing means coupled to said first processing means;
    second storage means coupled to said second processing means for storing data;
    second displaying means coupled to said second processing means for displaying information according to the data stored in said second storage means; and
    second inputting means for detecting coordinates data and controlling a pointer on said first displaying means, said second inputting means being disposed on a front side of said second displaying means in such a manner as to allow the information displayed on said second displaying means to be visually observed through said second inputting means.

13. An information processing apparatus according to claim 12, wherein said second processing means supplies the coordinates data inputted from said second inputting means to said first processing means, and said first processing means processes the coordinates data inputted from said second inputting means and controls said first displaying means to display the processed information.

14. An information processing apparatus according to claim 12, wherein said second processing means controls said second displaying means to display a menu of functions based on data stored in said second storage means and executes the function corresponding to coordinates inputted from said second inputting means.

15. An information processing apparatus according to claim 14, wherein said second processing means controls said second displaying means to display an image corresponding to a function selected from the menu.

16. An information processing apparatus according to claim 12, further comprising first power supply means for supplying power to said first processing means, said first displaying means, said first storage means, said second processing means, said second displaying means and said second storage means; and second power supply means for supplying power to said second processing means, said second displaying means and said second storage means, wherein said second processing means processes data stored in said second storage means or coordinates data inputted from said second inputting means and controls said second displaying means to display an information even when said first processing means is substantially in inoperative condition.

17. An information processing apparatus according to claim 1, wherein said second inputting means outputs coordinates data to said first processing means corresponding to an operation even when said second displaying means is substantially in inoperative condition.

18. An information processing apparatus according to claim 16, wherein said second inputting means outputs coordinates data to said first processing means corresponding to an operation even when said second displaying means and said second processing means are substantially in inoperative condition.

19. An information processing apparatus according to claim 16, wherein said second displaying means, said second inputting means, said second processing means and said second storage means are removably mounted as a portable information apparatus on said information processing apparatus.

20. A controlling method for controlling an information processing apparatus which includes first inputting means for inputting alphanumeric data, first processing means for processing the data from said first inputting means, first displaying means coupled to said first processing means for displaying information, storage means coupled to said first processing means for storing data, second displaying means coupled to said first processing means for displaying information according to the data stored in said storage means, second inputting means for detecting coordinates data and controlling a pointer on said first displaying means, said second inputting means being disposed on a front side of said second displaying means in such a manner as to allow the information displayed on said second displaying means to be visually observed through said second inputting means, the controlling method comprising:

a detection step of detecting a mode; and a displaying step of causing, in an ordinary operation mode, said first displaying means to display the information inputted from said first inputting means based on coordinate data inputted from said second inputted means.

21. A controlling method according to claim 20, further comprising a menu displaying step of controlling, in an extended mode, said second displaying means to display a menu for allowing selection of a function inputted from said second inputting means.

22. A controlling method according to claim 21, further comprising a second detection step of detecting that a function is detected from the menu, and an image displaying step of controlling said second displaying means to display an image corresponding to the selected function.

23. A program medium for causing an information processing apparatus, which includes first inputting means for inputting alphanumeric data, first processing means for processing the data from said first inputting means, first displaying means coupled to said first processing means for displaying information, storage means coupled to said first processing means for storing data, second displaying means coupled to said first processing means for displaying information according to the data stored in said storage means, second inputting means for detecting coordinates data and controlling a pointer on said first displaying means, said second inputting means being disposed on a front side of said second displaying means in such a manner as to allow the information displayed on said second displaying means to be visually observed through said second inputting means, to execute a program which comprise:

a detection step of detecting a mode; and a displaying step of causing, in an ordinary operation mode, said first displaying means to display the information inputted from said first inputting means based on coordinate data inputted from said second inputted means.

24. A program medium according to claim 23, wherein the program further comprises a menu displaying step of controlling, in an extended mode, said second displaying means to display a menu for allowing selection of a function inputted from said second inputting means.

25. A program medium according to claim 24, wherein the program further comprises a second detection step of detecting that a function is detected from the menu, and an image displaying step of controlling said second displaying means to display an image corresponding to the selected function.

* * * * *